US008553254B2

(12) United States Patent
Matsugashita

(10) Patent No.: US 8,553,254 B2
(45) Date of Patent: Oct. 8, 2013

(54) MEANS TO REDUCE A LOAD ON A COMPUTER AND EFFICIENTLY MANAGE PRINTING JOBS OR PRINTING DEVICES JOBS

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1380 days.

(21) Appl. No.: 11/924,355

(22) Filed: Oct. 25, 2007

(65) Prior Publication Data

US 2008/0151304 A1 Jun. 26, 2008

(30) Foreign Application Priority Data

Dec. 22, 2006 (JP) .................................. 2006-346199

(51) Int. Cl.
*G06F 3/12* (2006.01)
(52) U.S. Cl.
USPC ........................... 358/1.15; 358/1.14; 710/17
(58) Field of Classification Search
USPC ................. 358/1.14, 1.15; 400/76; 710/7, 17
See application file for complete search history.

(56) References Cited

U.S. PATENT DOCUMENTS

| | | | | |
|---|---|---|---|---|
| 6,452,692 B1 * | 9/2002 | Yacoub | ........................ | 358/1.15 |
| 6,474,881 B1 * | 11/2002 | Wanda | ............................. | 400/76 |
| 6,856,416 B1 * | 2/2005 | Danknick | .................... | 358/1.15 |
| 7,027,169 B1 * | 4/2006 | Morikawa et al. | ............ | 358/1.15 |
| 7,139,085 B1 * | 11/2006 | Sakaguchi | ................... | 358/1.15 |
| 7,199,890 B2 * | 4/2007 | Kawamoto | .................... | 358/1.15 |
| 7,266,590 B2 | 9/2007 | Nakaoka et al. | | |
| 7,370,090 B2 | 5/2008 | Nakaoka et al. | | |
| 7,610,411 B2 * | 10/2009 | Umekage et al. | ................ | 710/17 |
| 7,907,292 B2 * | 3/2011 | Suzuki | .......................... | 358/1.15 |
| 2002/0027673 A1 * | 3/2002 | Roosen et al. | ................ | 358/1.15 |
| 2002/0131069 A1 * | 9/2002 | Wanda | .......................... | 358/1.14 |
| 2003/0007819 A1 * | 1/2003 | Wanda | ............................. | 400/76 |
| 2005/0088681 A1 * | 4/2005 | Hosoda | ........................ | 358/1.15 |
| 2005/0128505 A1 * | 6/2005 | Shirai et al. | ................... | 358/1.14 |
| 2005/0128512 A1 * | 6/2005 | Kurotsu | ........................ | 358/1.15 |
| 2005/0128513 A1 | 6/2005 | Cho | | |
| 2005/0141013 A1 * | 6/2005 | Kikuchi et al. | ............... | 358/1.15 |
| 2006/0126115 A1 * | 6/2006 | Morikawa et al. | ............ | 358/1.15 |
| 2006/0193006 A1 * | 8/2006 | Lawrence et al. | ............. | 358/1.15 |

(Continued)

FOREIGN PATENT DOCUMENTS

EP 1184779 3/2002
JP 2001-290623 A 10/2001

OTHER PUBLICATIONS

European Search Report issued in corresponding application No. 07121290.6 on May 14, 2013.

*Primary Examiner* — Twyler Haskins
*Assistant Examiner* — Nicholas Pachol
(74) *Attorney, Agent, or Firm* — Carter, DeLuca, Farrell & Schmidt, LLP

(57) ABSTRACT

Monitoring of a large number (for example, hundreds) of printing devices in parallel makes a processing load very heavy. Or, the monitoring extremely increases the cost of a monitoring computer. A connection-managing unit sequentially monitors the states of printing devices within the number of connections less than the number of printing devices. Meanwhile, a transfer-managing unit sequentially transfers printing jobs to the printing devices within the number of connections less than the number of printing devices. The state-monitored printing devices are sequentially switched without synchronizing the state monitoring of the printing devices with the end of the transfer of the printing jobs, i.e., without waiting for the end of the transfer of the printing jobs.

10 Claims, 29 Drawing Sheets

(56) References Cited

U.S. PATENT DOCUMENTS

| | | |
|---|---|---|
| 2006/0196006 A1 | 9/2006 | Willis |
| 2006/0274370 A1* | 12/2006 | Shima .......................... 358/1.15 |
| 2007/0083679 A1* | 4/2007 | Kikuchi ........................... 710/8 |
| 2007/0091361 A1* | 4/2007 | Matsugashita ............... 358/1.15 |

\* cited by examiner

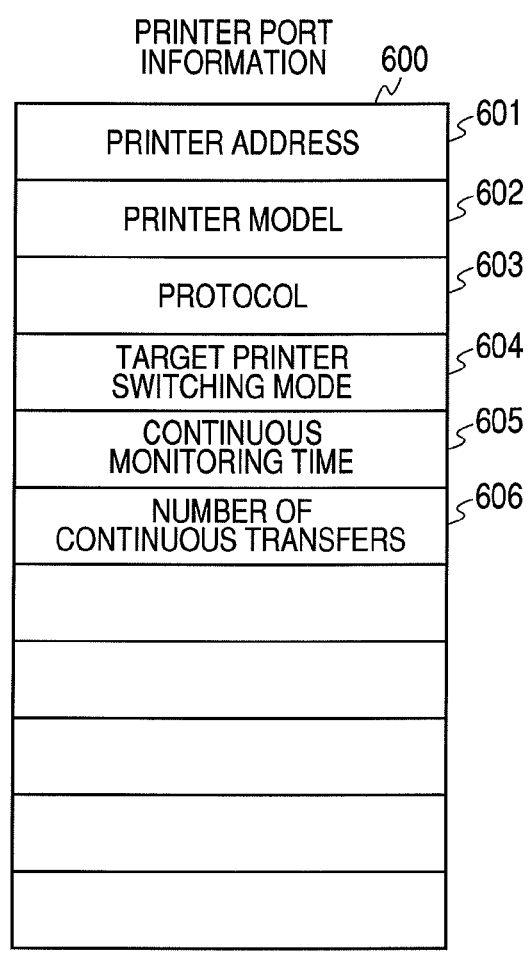

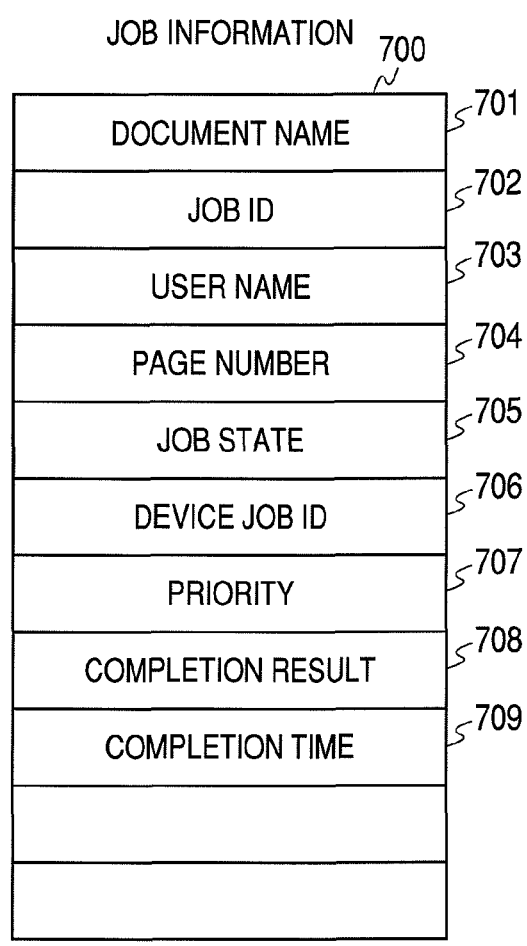

FIG. 8

CONNECTION ORDER LIST 800

| ORDER | PRINTER NAME | NUMBER OF UNTRANSFERRED JOBS | PRIORITY | STATE | NUMBER OF TRANSFERRED JOBS | TRANSFER STATUS |
|---|---|---|---|---|---|---|
| 1 | PRINTER A | 2 | MEDIUM | CONNECTED | 2 | BEING TRANSFERRED |
| 2 | PRINTER B | 3 | MEDIUM | CONNECTED | 1 | BEING TRANSFERRED |
| 3 | PRINTER C | 1 | MEDIUM | CONNECTED | 0 | BEING TRANSFERRED |
| 4 | PRINTER D | 2 | HIGH | WAITING FOR CHECK | 0 | TRANSFER ERROR |
| 5 | PRINTER F | 3 | MEDIUM | WAITING FOR CONNECTION | 0 | WAITING FOR TRANSFER |
| ... | ... | ... | ... | ... | ... | ... |
| N | PRINTER X | 5 | LOW | WAITING FOR CHECK | 3 | TRANSFER COMPLETED |

FIG. 9

TRANSFER CONNECTION ORDER LIST 900

| ORDER | PRINTER NAME | UNTRANSFERRED JOBS | PRIORITY | STATE |
|---|---|---|---|---|
| 1 | PRINTER A | 2 | MEDIUM | BEING TRANSFERRED |
| 2 | PRINTER B | 3 | MEDIUM | BEING TRANSFERRED |
| 3 | PRINTER C | 1 | MEDIUM | BEING TRANSFERRED |
| 4 | PRINTER D | 2 | HIGH | TRANSFER ERROR |
| 5 | PRINTER F | 3 | MEDIUM | WAITING FOR TRANSFER |
| ... | ... | ... | ... | ... |
| N | PRINTER X | 5 | LOW | TRANSFER COMPLETED |
| | | | | |
| | | | | |

FIG. 11

CONNECTION LIST 1100

| MANAGEMENT ID | UNIQUE ID | EVENT REGISTRATION | HISTORY MODE |
|---|---|---|---|
| 1 | ce2fe702-db72-446b-9a79-541500dba919 | ON | ON |
| 2 | fde7c052-c838-423b-8d98-c48ac5961aeb | ON | ON |
| 3 | c88a4669-ebf3-4171-86c4-ef59be0ad93a | ON | OFF |
| 4 | 0363169a-aaa1-4899-b4cc-97cf8539355a | ON | OFF |
| 5 | ff7d6d00-ce7d-407b-9e60-57197b443ff99 | ON | ON |
| ... | ... | ... | ... |
| N | 00ff273b-02fd-4611-8ffc-311902b13446 | ON | ON |

FIG. 12

SCHEDULE LIST 1200

| ORDER | UNIQUE ID | STATE | |
|---|---|---|---|
| 1 | ce2fe702-db72-446b-9a79-541500dba919 | PRINTING | JOB INFORMATION |
| 2 | ce2fe702-db72-446b-9a79-541500dba919 | TRANSFERRED | JOB INFORMATION |
| 3 | ce2fe702-db72-446b-9a79-541500dba919 | TRANSFERRED | JOB INFORMATION |
| 4 | c88a4669-ebf3-4171-86c4-ef59be0ad93a | BEING TRANSFERRED | JOB INFORMATION |
| 5 | c88a4669-ebf3-4171-86c4-ef59be0ad93a | WAITING | JOB INFORMATION |
| ⋮ | ⋮ | ⋮ | ⋮ |
| N | ff7d6d00-ce7d-407b-9e60-57197b43ff99 | WAITING | JOB INFORMATION |
| | | | |
| | | | |
| | | | |

FIG. 26

CONNECTION ORDER LIST 800  ~2601

| ORDER | PRINTER NAME | NUMBER OF UN-TRANSFERRED JOBS | PRIORITY | STATE | NUMBER OF TRANSFERRED JOBS | TRANSFER STATUS |
|---|---|---|---|---|---|---|
| 1 | DEVICE 104A | 2 | MEDIUM | CONNECTED | 3 | BEING TRANSFERRED |
| 2 | DEVICE 104B | 3 | MEDIUM | CONNECTED | 2 | BEING TRANSFERRED |
| 3 | DEVICE 104C | 5 | MEDIUM | WAITING FOR CONNECTION | 0 | WAITING FOR TRANSFER |
| 4 | DEVICE 104D | 5 | MEDIUM | WAITING FOR CONNECTION | 0 | WAITING FOR TRANSFER |
| 5 | | | | | | |

⇩ ~2602

| ORDER | PRINTER NAME | NUMBER OF UN-TRANSFERRED JOBS | PRIORITY | STATE | NUMBER OF TRANSFERRED JOBS | TRANSFER STATUS |
|---|---|---|---|---|---|---|
| 1 | DEVICE 104B | 3 | MEDIUM | CONNECTED | 2 | BEING TRANSFERRED |
| 2 | DEVICE 104C | 5 | MEDIUM | CONNECTED | 0 | WAITING FOR TRANSFER |
| 3 | DEVICE 104D | 5 | MEDIUM | WAITING FOR CONNECTION | 0 | WAITING FOR TRANSFER |
| 4 | DEVICE 104A | 2 | MEDIUM | WAITING FOR CHECK | 3 | BEING TRANSFERRED |
| 5 | | | | | | |

TRANSFER CONNECTION ORDER LIST 900  ~2603

| ORDER | PRINTER NAME | NUMBER OF UNTRANSFERRED JOBS | PRIORITY | STATE |
|---|---|---|---|---|
| 1 | DEVICE 104A | 2 | MEDIUM | BEING TRANSFERRED |
| 2 | DEVICE 104B | 3 | MEDIUM | BEING TRANSFERRED |
| 3 | DEVICE 104C | 5 | MEDIUM | WAITING FOR TRANSFER |
| 4 | DEVICE 104D | 5 | MEDIUM | WAITING FOR TRANSFER |
| 5 | | | | |

⇩ ~2604

| ORDER | PRINTER NAME | NUMBER OF UNTRANSFERRED JOBS | PRIORITY | STATE |
|---|---|---|---|---|
| 1 | DEVICE 104A | 2 | MEDIUM | BEING TRANSFERRED |
| 2 | DEVICE 104B | 3 | MEDIUM | BEING TRANSFERRED |
| 3 | DEVICE 104C | 5 | MEDIUM | WAITING FOR TRANSFER |
| 4 | DEVICE 104D | 5 | MEDIUM | WAITING FOR TRANSFER |
| 5 | | | | |

MEANS TO REDUCE A LOAD ON A COMPUTER AND EFFICIENTLY MANAGE PRINTING JOBS OR PRINTING DEVICES JOBS

BACKGROUND OF THE INVENTION

1. Field of the Invention

The present invention relates to a mechanism to reduce a load on a computer and efficiently to manage printing jobs or printing devices.

2. Description of the Related Art

A distributed printing technique to realize high-speed printing by distributing printing jobs on a network and using a plurality of printer is disclosed in Japanese Patent Application Laid-Open No. 2001-290623. The document discloses that a job issuer such as a personal computer collects the states of the printing jobs distributed to the plurality of printer and the personal computer manages the states of the printing jobs in parallel.

However, for example, a large quantity of printing jobs may be populated for printing to a large number of printing devices on various places connected to a network throughout the country. In order to monitor hundreds of such printing devices, for example, not several printing devices, the monitoring method disclosed in Japanese Patent Application Laid-Open No. 2001-290623 is not realistic. Monitoring of hundreds of printing devices in parallel makes a processing load very heavy. Or, the monitoring extremely increases the cost of a monitoring computer.

SUMMARY OF THE INVENTION

According to one aspect of the present invention there is provided an information-processing apparatus configured to communicate with a plurality of printing devices, comprising: a first registering unit configured to sequentially register the printing devices which are output targets of printing jobs and from which state information is to be acquired in a monitoring queue in a first registration order; a second registering unit configured to sequentially register the printing devices which are the output targets of the printing jobs in a transferring queue in a second registration order; a state-monitoring unit configured to connect the printing devices according to the first registration order and acquire the state information from the printing devices; and a transfer-control unit configured to transfer the printing jobs according to the second registration order, wherein the state-monitoring unit is configured to sequentially switch connections to the printing devices according to the first registration order and to acquire the state information from the printing devices even if the transfer control unit has not completed the transfer of the printing jobs.

According to another aspect of the present invention, a job-processing method for an information-processing apparatus that can communicate with a plurality of printing devices, comprising: sequentially registering the printing devices which are output targets of printing jobs and from which state information is to be acquired in a monitoring queue in a first registration order; sequentially registering the printing devices which are the output targets of the printing jobs in a transferring queue in a second registration order; connecting the printing devices according to the first registration order and acquiring the state information from the printing devices; and transferring the printing jobs according to the second registration order, wherein the connecting and acquiring comprise sequentially switching connections to the printing devices according to the first registration order and acquiring the state information from the printing devices even if the transferring step has not completed the transfer of the printing jobs.

According to the present invention, a monitoring load of monitoring printing devices or printing jobs is reduced even if a plurality of printing device is populated with a large quantity of printing jobs, for example. Therefore, the cost of a computer is not increased beyond necessity.

Other objects, configuration and effects of the present invention will be apparent from the following detailed description and the drawings.

Embodiments of the present invention will be described with reference to the accompanying drawings, which are briefly described below.

BRIEF DESCRIPTION OF THE DRAWINGS

FIG. 6 is a schematic depiction of printer-port information.

FIG. 7 is a schematic depiction of job information.

FIG. 8 is a schematic depiction of a connection-order list shown in FIG. 4.

FIG. 9 is a schematic depiction of a transferring-connection-order list shown in FIG. 4.

FIG. 11 is a schematic depiction of a connection list shown in FIG. 10.

FIG. 12 is a schematic depiction of a schedule list shown in FIG. 10.

FIG. 26 is a drawing of transition examples of a connection-order list 800 and a transferring connection-order list 900.

DESCRIPTION OF THE EMBODIMENTS

First Embodiment

The following will describe an embodiment of the present invention with reference to the drawings.

Figure 1:
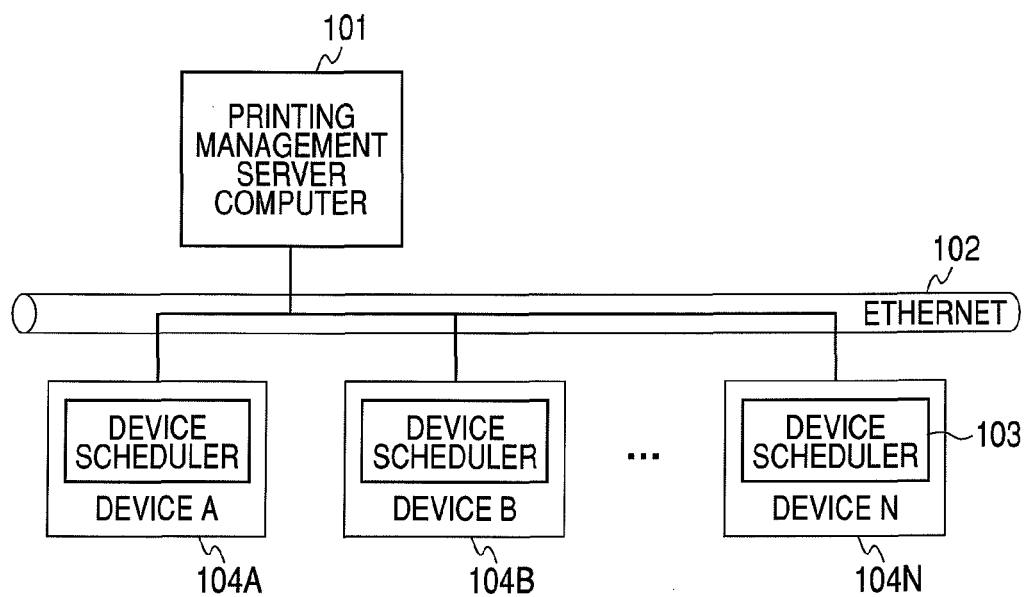
FIG. 1 is a block diagram illustrating overall configuration of a printing system according to an embodiment.

FIG. 1 is a block diagram illustrating a configuration of a printing system according to the present invention. In the system, a plurality of network printers are connected.

In FIG. 1, devices 104A, 104B and 104N are printing devices (hereinafter, referred to as "devices"). The printing devices are connected to a network 102 via a network interface (not shown). Each of the devices analyzes a printing job including printed-character data transferred from a printing-management server 101 and converts a dot image page-by-page for printing. A printing job herein is a generic term including drawing data such as a page description language and various types of job setting data for printing characters such as printing layout setting. The devices 104A, 104B and 104N can be a laser beam printer using electronography or an ink-jet printer using an ink-jet system.

Each of the devices 104A, 104B and 104N includes a device scheduler 103 that manages a schedule of a printing job, maintains a printing job history or manages various types of states of the printing job as described below.

The device scheduler 103 can be configured using dedicated hardware, for example. The scheduler can also be configured such that a platform provided in a device referred to as an EAP (Embedded Application Platform) executes an application. The device scheduler 103 can also configured by cooperation between hardware and software. Further, an information-processing apparatus, which is connected to the devices 104A, 104B and 104N so as to able to communicate with the devices, can execute part of the processing to implement functions of the scheduler 103. Furthermore, the scheduler 103 can be previously built in a printing device or be added as an optional function.

The information-processing apparatus 101 is a printing-management server (referred to as a printing-management server computer in the figures) according to this embodiment. The printing-management server is connected to the network 102 through a network cable. The server accumulates files used on the network and monitors a usage state of the network 102. The printing-management server 101 manages a plurality of printers connected to the network 102. The printing-management server 101 is a general information-processing apparatus from which a printing-management service is executable.

Hardware Configuration Diagram

Figure 2:
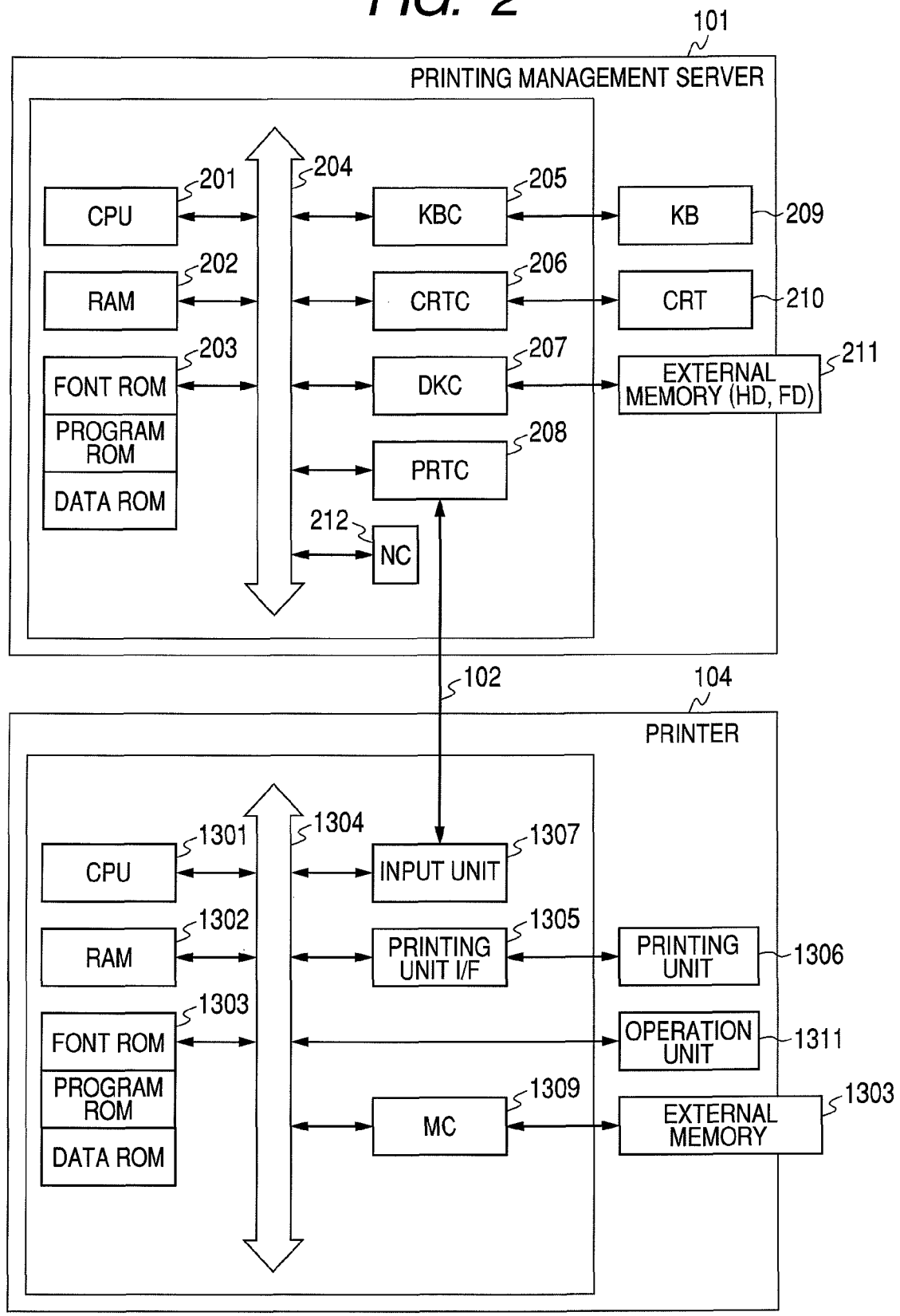
FIG. 2 is a block diagram illustrating one example of hardware configuration of a printing-management server 101 and a device 104 shown in FIG. 1.

FIG. 2 is a block diagram for simply illustrating the connection between the printing-management server 101 and one of the devices 104 shown in FIG. 1 and illustrating each hardware configuration.

A CPU 201 executes programs such as an OS and an application. The programs are stored in a program ROM in a ROM 203 or loaded to a RAM 202 from one of a hard disk 211. An OS is an abbreviation of an operating system running on a computer; hereinafter, an operating system is referred to as an OS. The processing of flowcharts described below can be implemented through execution of the programs. The RAM 202 functions as one of a main memory and a work area of the CPU 201. A keyboard controller (KBC) 205 controls key input from a keyboard 209 and a pointing device (not shown). A CRT controller (CRTC) 206 controls display on a CRT display 210. A disk controller (DKC) 207 controls data access in the hard disk (HD) 211 and a floppy (R) disk (FD) for storing various types of data. A PRTC 208 controls the exchange of a signal with the device 104 connected to the PRTC 208. An NC 212, which is connected to a network, executes control processing for communication with other machines connected to the network. Although the NC 212 is a unit independent from the PRTC 208 in the drawing, it can be integrated in the PRTC since the NC 212 functions as network communication means by cooperating with the PRTC 208.

Next, configuration of the device 104 will be described. As shown in the drawing, in the device 104, a printer CPU 1301 controls blocks connected to a system bus 1304 based on a control program stored in a ROM 1302 and an external memory 1303. An image signal generated through processing by the CPU 1301 is output as output information to a printing unit (printer engine) 1306 via a printing unit I/F 1305. The CPU 1301 can communicate with the printing-management server 101 via an input unit 1307 so that the CPU 1301 can notify the printing-management server 101 of information in the device 104.

A program ROM in the ROM 1302 stores the control program for the CPU 1301. A font ROM in the ROM 1302 stores font data used to generate output information. A data ROM in the ROM 1302 stores various types of information used on the printing-management server 101 if a printer does not include the external memory 1303 such as a hard disk.

A RAM 1308 is a RAM functioning as a main memory or a work area for the CPU 1301. The RAM 1308 can expand the memory capacity by using an option RAM connected to an expanded port (not shown). The RAM 1308 is used as an output information deployment region (a bit map data deployment region), an environment data storage region (printing job setting and state information of a printing job, for example), an NVRAM and the like. Accesses to the external memory 1303 such as a hard disk (HD) or an IC card described above are controlled by a memory controller (MC) 1309. The external memory 1303, which is connected as an option, stores font data, an emulation program and form data, for example. An operation panel 1311 includes switches and an LED display for operation.

Figure 3:
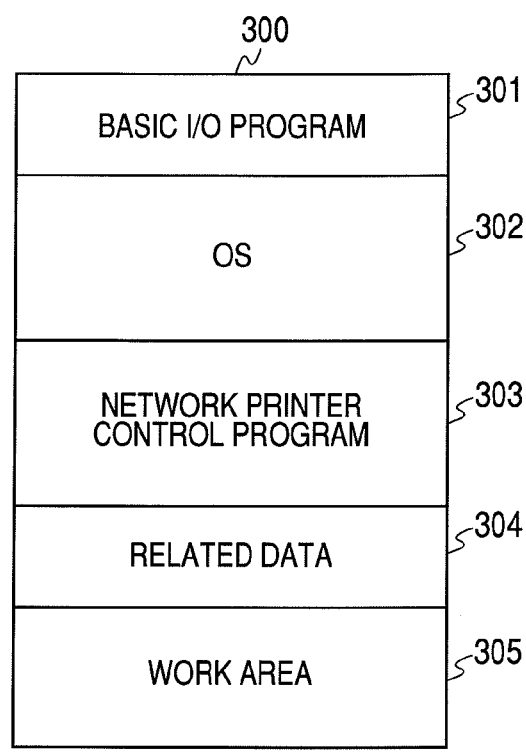
FIG. 3 is a drawing of one example of a memory map in a RAM 202 shown in FIG. 2.

FIG. 3 is a drawing of one example of a memory map in the RAM 202 shown in FIG. 2. In the drawing, the memory map is in an executable state when a printing-management service is loaded on the RAM 202.

A program can be loaded from the external memory 211 to the RAM 202 directly for execution. Further, the printing-management service can be stored in the program ROM 203 to be a part of the memory map for direct execution by the CPU 201. Software to implement functions equivalent to those of the apparatuses can substitute for the hardware apparatuses.

The printing-management service controls transfer of a printing job, a direction to change a target printer of the printing job, or a direction to change the printing order in the printing-management server.

A region 301 stores a basic I/O program. The basic I/O program is a program having an IPL (initial program loading) function to read an OS into the RAM 202 from the external memory 211 and start the operation of the OS when the printing-management server 101 is powered on.

A region 302 stores the OS (operating system), while a region 303 stores the printing-management service. A region 304 stores relation data. A region 305 is a work area for the CPU 201 to execute various types of programs.

Software Configuration Diagram

Figure 4:
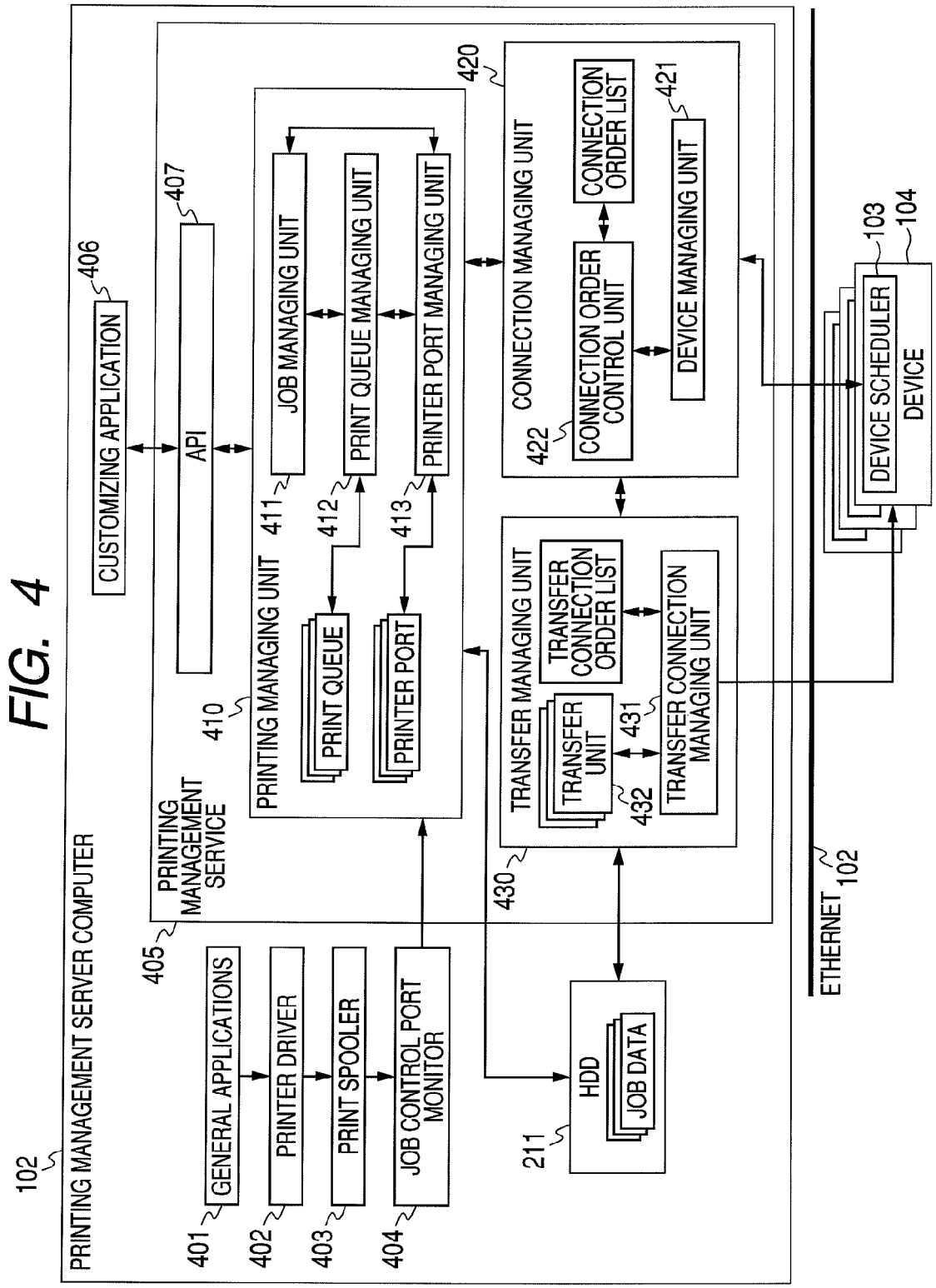
FIG. 4 is a block diagram illustrating one example of software configuration of a printing-management server 101 shown in FIG. 1.

Next, software configuration of the printing-management server 101 in the print system will be described. FIG. 4 is a drawing of one example of the software configuration in the printing-management server 101. In the drawing, the software configuration by the blocks represents functions implemented through the execution of various types of programs stored in the ROM and the HDD by the CPU 201 in FIG. 2.

Normally, when a general application 401 such as the Microsoft (R) Word accepts a printing direction, the application 401 generates a series of drawing commands via the OS. A printer driver 402 receives the drawing commands generated via the OS and generates a printing job including a PDL file that can be interpreted by the devices 104A to 104N based on the series of drawing commands. If the devices 104A to 104N differ from one another in a model, the printing-management server 101 might be equipped with the printer drivers 402A to 402N corresponding to the respective devices.

The printer driver 402 passes data of the generated printing job to a print spooler 403 to transfer the generated printing job to the devices. The OS is the Windows (R) herein, hence the print spooler 403 is a Windows (R) spooler. However, it is needless to say that an OS of a computer to apply the present invention is not limited to the Windows (R), but another OS that includes a drawing instruction can also be applied.

The print spooler 403 follows a procedure to pass the printing job to a job control port monitor 404 that is selected and directed by a user via a user interface and to transfer the job to the devices 104A to 104N.

Prior to the processing described below, a user directs printing by designating the job control port monitor 404 for previously transferring the printing job to a printing-management service 405.

The printing-setting information such as the paper size and a stapling direction is set via a printer-driver interface. The information is notified to the job control port monitor 404. The job control port monitor 404 notifies the printing-management service 405 not only of a printing job passed from the high level but also of the notified printing setting information.

One of customizing application 406 of the printing-management server 101 and another information-processing apparatus on the network 102 available to the printing-management server 101 populates the printing job to the printing-management service 405 via an API (Application Program Interface) 407.

The printing-management service 405 includes the API 407 being an interface with an external application, a printing-managing unit 410, a connection-managing unit 420 and a transfer-managing unit 430 for controlling transfer of a printing job to devices. Although the drawing illustrates these function blocks in software configuration, similar functions can be implemented even if any of the function blocks is configured as hardware.

The printing-managing unit 410 includes a job-managing unit 411 for maintaining the status of a current job, a print-queue-managing unit 412 for managing a plurality of print queues, and a printer-port-managing unit 413 for managing a plurality of printer ports. Functions of the configuration units will be described later in detail.

The connection-managing unit 420 includes a device-managing unit 421 for maintaining the states of current devices, a connection-order-control unit 422 for managing the order of connections to the devices and a connection-order list for maintaining that order. The unit 420 controls switching of a target printer (a target of state monitoring), being a feature of the present invention. The switching control of the target printer will be described later in detail.

The transfer-managing unit 430 includes a transferring-connection-managing unit 431 for maintaining the transfer statuses of the current devices, a plurality of transfer units 432 for transferring a printing job to the devices, and a transferring-connection-order list for maintaining the transfer order. The unit 430 implements characteristic-transferring-connection-order control processing. The unit 430 functions as means for sequentially registering printing devices being output destinations of a printing job to be transferred by the transfer-managing unit 430 in the transferring-connection-order list. The control processing will be described later in detail.

Print-Queue Information

Figure 5:
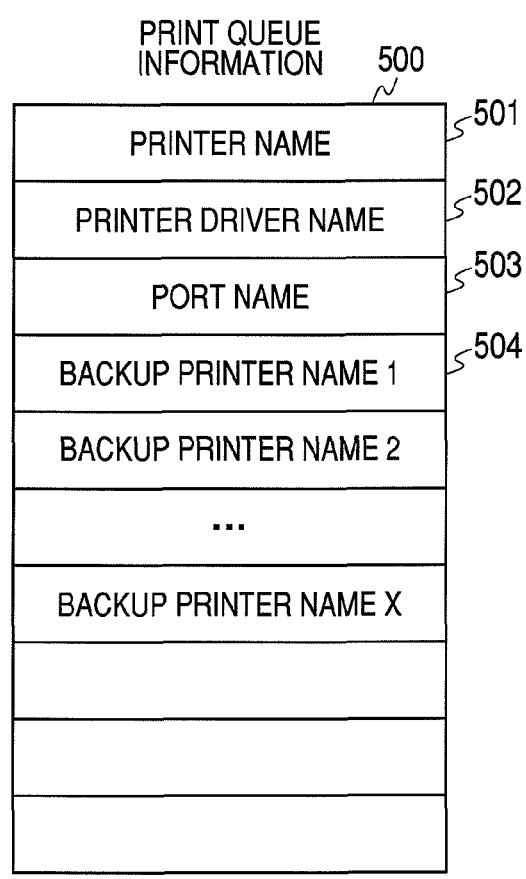
FIG. 5 is a schematic depiction of print-queue information.

FIG. 5 is a drawing of print-queue information 500 for deciding the operation of a printing job. The job is accepted in a print queue (the upper leftmost part in the printing-managing unit 410) from the job control port monitor 404. The print-queue information 500 has been set beforehand in correspondence to the print queue at a certain time.

The following will describe a printer name 501, a printer driver name 502, a port name 503, and a backup printer name 504 being settings of the print-queue information 500.

The printer name 501, which indicates a printer object name of Windows (R), is a different name for each printer object. The name 501 can serve to identify a printer object. The printer driver name 502 is a name of a printer driver being set for a printer object. The port name 503 is a name of a printer port corresponding to a printer name. The backup-printer name 504 is a name of a printer for alternate printing used for alternate printing and load-distribution printing processing. A plurality of printer names 504 can be registered as in the example in FIG. 5.

When an error such as paper-out occurs in a device to which a printing job is populated, the load-distribution printing processing is performed using a plurality of backup printers being set in the print queue that has accepted a printing job and the print-queue information. Particularly, the printing job is transferred or moved to a device to which jobs can be sequentially transferred for alternate printing. Such a device is selected from the plurality of backup printers being set in the print queue that has accepted a printing job and the print-queue information. A method of deciding a printer to which jobs can be transferred includes a method of extracting one of a devices that is primarily determined to be appropriate for transfer and a device according to previously decided priority.

Printer-Port Information

FIG. 6 is a drawing of printer-port information 600 to decide the operation to transfer a printing job to printers. The information 600 has been set beforehand in correspondence to the print queue at a certain time in association with the printer ports in the lower leftmost part in the printing-managing unit 410 in FIG. 4. A printer address 601, which is a network address of a device being a printing-job transfer destination, is associated with an IP address of the corresponding device or a name used for name resolution (DNS: Domain Name System). A printer model 602 is a printer-model name indicating the type of the device being a printing-job transfer destination. If the operations differ from one another due to the difference in a printer model, the definition of each printer model is created to absorb the operation difference. The processing to absorb the difference will not be described in detail herein. A protocol 603 is a communication protocol to transfer a printing job to the devices. The protocol 603 includes, for example, a protocol referred to as an LPR to transfer a printing job by mutual communication or a RAW protocol to transfer a printing job directly. An LPR is an abbreviation of Line PRinter deamon Protocol.

The characteristic setting in the printing system includes setting of device or job monitoring being set in the printer-port information 600. A target-printer-switching mode 604 is a setting field for target-printer switching described later in detail in relation to flowcharts. Continuous-monitoring time 605 and number of continuous transfers 606 are conditions for the printing switching. The continuous-monitoring time 605 indicates a time limit to continuously monitor a device or a printing job. The number of continuous transfers 606 indicates a condition of the number of printing jobs to be transferred continuously to the same device. Although the drawing illustrates the continuous-monitoring time 605 and the number of continuous transfers 606 as the switching conditions for a target printer, the conditions are not limited to them. For example, the conditions can include various types of specific conditions such as the printing-job transfer size.

Job Information

FIG. 7 illustrates job information 700 of a printing job populated from one of the general application 401 and the customizing application 406. The information 700 is saved in the HDD 211 and managed by the job-managing unit 411.

If the customizing application 406 populates a job, a printing job is input to the printing-managing unit 410 through the API 407 in FIG. 4. On the other hand, if a job is populated through the general application, the printing job is input to the printing-managing unit 410 through the job control port monitor 404. When the printing-managing unit 410 inputs a printing job, the unit 410 generates the job information 700 corresponding to the job and registers the generated job information 700 in the print queue. Real data of the printing job is associated with the job information 700 and saved in the HDD 211 as shown in FIG. 4.

The job information 700 includes a document name 701, a job ID 702 issued in the printing-management service, a name of a user who performed printing 703, the number of pages 704 and a job state 705. The job information 700 also includes a device job ID 706 generated in a device, a priority to decide the scheduling order 707, a completion result 708, and a completion time 709.

The job state 705 can be a state of, for example, spooling, being transferred, printing, being stopped, or printing completed depending on a current state of a job.

Connection-Order List 800

FIG. 8 illustrates one example of a connection-order list 800 shown in FIG. 4. In the connection-order list 800, an identifier of a device to be monitored, and appendix information of respective devices are registered basically in a FIFO. The connection-order list 800, or setting based on the connection-order list 800, may be referred to as a monitoring queue, which means setting to manage the order of monitoring by the printing-management server 101. According to the registration order of the devices in the connection-order list 800, monitoring of the states of the devices is executed sequentially.

The "connection" herein indicates establishment of a communication session based on management by the connection-managing unit 420 described in the above. During the communication session, various types of states can be acquired and requested. To interrupt monitoring a printing device indicates to disconnect the established communication session. The connection-order list 800 shown in FIG. 8 is updated at S1502 in FIG. 15 as described below.

In columns in the connection-order list 800, the following items are set: a name of a printer to be connected, the number of jobs that have not been transferred registered in each printer queue, connection priority, the connection state, and the number of transferred jobs being the number of jobs that have been transferred during the current connection. FIG. 8 indicates that printers have been connected to a device on the connection place of 1 to 3, while the printers are waiting for connection after the fourth place. A printer can be in a state of "waiting for check" in which a printer is disconnected to again wait for connection while the printer has been connected or is waiting for connection. The "waiting for check" is included in "waiting for connection" in a broad sense.

The connection-managing unit 420, described in the above, decides a connection order based on information registered (set) in the connection-order list 800. The processing will be described later in detail.

Transferring-Connection-Order List 900

FIG. 9 illustrates one example of the transferring-connection-order list 430 in FIG. 4. In the transferring-connection-order list 900, an identifier of a device being a transfer destination for a printing job, and appendix information of transfer to each device are registered basically in FIFO. According to the registration order of devices in the transferring-connection-order list 900, transfer of a printing job to the devices is executed sequentially. That is, the list 900 functions as a transferring queue in which printing devices are sequentially registered. The devices are output destinations of a printing job to be transferred.

Columns in the transferring-connection-order list 900 includes the following items: a name of a printer to be connected, priority of transferring connection, and a transferring connection state. The transferring-connection-managing unit 431 decides the transferring-connection-order based on information listed in the transferring-connection-order list 900. The processing will be described later in detail.

Functional Block Diagram of Printing Device

Figure 10:
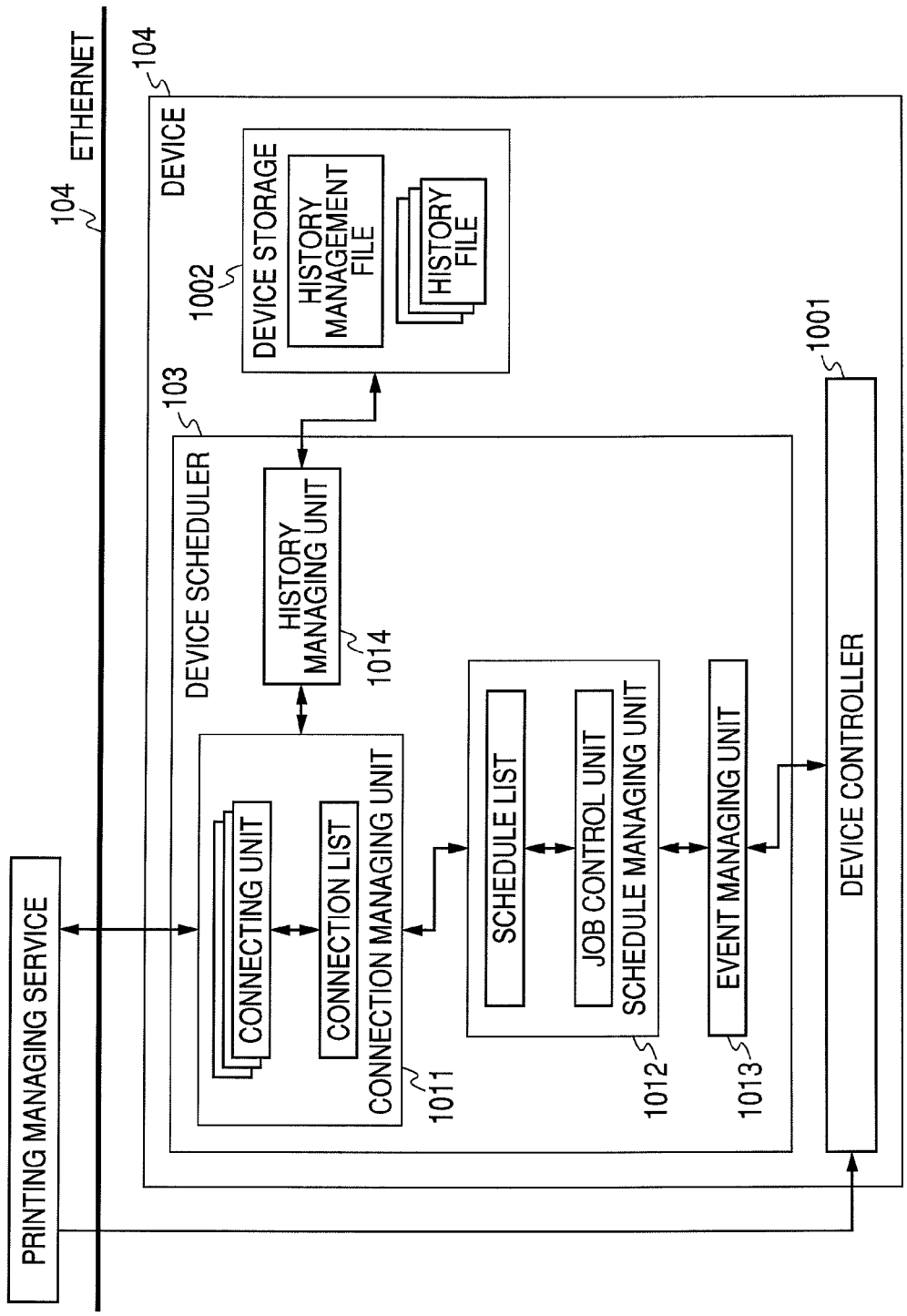
FIG. 10 is a block diagram illustrating one example of configuration of a device scheduler 103 and the device 104 shown in FIG. 1.

FIG. 10 is a drawing of one example of configuration of the devices 104A to 104N shown in FIG. 1. Although hardware blocks and software blocks coexist in the drawing, each of the blocks represents a specific function of one of the devices.

A device controller 1001, which is a module for controlling a device, manages and controls the state of hardware and the state of a populated printing job. The controller 1001 corresponds to the CPU 1301 and the printing unit I/F 1305 described in FIG. 2. In the case of a device being a complex machine having a plurality of function such as printing, copy, FAX or scan referred to as an MFP (Multi Function Printer), the device controller 1001 corresponds to a module for managing and controlling the functions in an integrated way.

A device storage 1002, which is one of a persistent storage region and a persistent storage apparatus included in a device or connected for mutual communication, is implemented as a data-storing unit such as a RAM or an HDD.

As described before, each of the devices 104A to 104N includes the device scheduler 103 for managing scheduling of a printing job or for maintaining and managing a printing-job history described below. The device scheduler 103 includes a connection-managing unit 1011, a schedule-managing unit 1012, an event-managing unit 1013, and a history-managing unit 1014.

The connection-managing unit 1011 includes a plurality of connecting units for communication with the printing-management service 405, and a connection list 1100 described below. The list 100 maintains the status of connection to the printing-management service 405 and event information registered by the printing-management service 405.

The schedule-managing unit 1012 manages a printing-job list accepted from the printing-management service 405. The unit 1012 includes a schedule list 1200 described below and a job-control unit for controlling the printing jobs to schedule a printing job.

The event-managing unit 1013 maintains a hardware state of the device controller 1001 and accepts a change in the hardware state from the device controller 1001. Then, the unit 1013 notifies the printing-management service 405 connected through schedule-managing unit 1012 and the connection-managing unit 1011 of the information.

The unit 1013 also accepts a change in the printing job state in the device controller 1001 and notifies the schedule-managing unit 1012 of the change. The schedule-managing unit 1012 receives the notification, updates a job state contained in the schedule list and asks the connection-managing unit 1011 to notify the connected printing-management service 405 of the change.

The history-managing unit 1014 is a module for managing a completion history of a printing job. The unit 1014 generates, reads/writes and removes a history file in the device storage 1002 according to a direction by the connection-managing unit 1011. The history file is managed by a history-management file operated by the history-managing unit 1014. The management processing of the printing job history will be described later in detail.

Although not shown in FIG. 10, each of the devices 104A to 104N is equipped with a printer engine for forming an image in a recording medium and a sensor mechanism for detecting various types of information in the printer engine, for example. The printer engine and the mechanism have been described in relation to FIG. 3.

Connection List 1100 in Device

FIG. 11 illustrates one example of the connection list 1100 generated by the connection-managing unit 1011. In the connection list 1100, a unique ID of a computer connected by opening a communication session to the device scheduler 103 is registered. The connection list 1100 includes a plurality of computer (unique ID), one of which is the printing-management server 101 in FIG. 1. Note that the registration order of the computers in the connection list 1100 does not define the printing order. The printing order is decided based on the schedule list 1200 described below. The following will describe the connection list 1100 in detail.

The connection list includes a management ID, a unique ID notified from the printing-management service, an event registration field to set whether or not to request an event notified from a device controller, and a history-mode field to set whether or not to use the printing-job history function. The following description is based on setting to use the history function.

A unique ID is a hexadecimal 32-digit numerical value referred to as a UUID (Universally Unique IDentifier) in this embodiment. However, the ID can be any means for uniquely identifying each service to be connected.

Schedule List in Device

FIG. 12 illustrates one example of the schedule list 1200 generated by the schedule-managing unit 1012 in a device. The schedule-managing unit 1012 manages the processing order of printing jobs from computers contained in the connection list 1100. In the schedule list 1200 in FIG. 12, jobs 1 to 3 are registered as printing jobs from the same computer (an issuer of the printing jobs).

The schedule list contains the printing order, a unique ID common with the connection list, a device job ID notified from the device controller 1001, the job state, and the job information shown in FIG. 7. In the schedule list, jobs are scheduled according to the order of receiving schedules and the priority 707 contained in the job information.

History-Management File in Device

Figure 13:
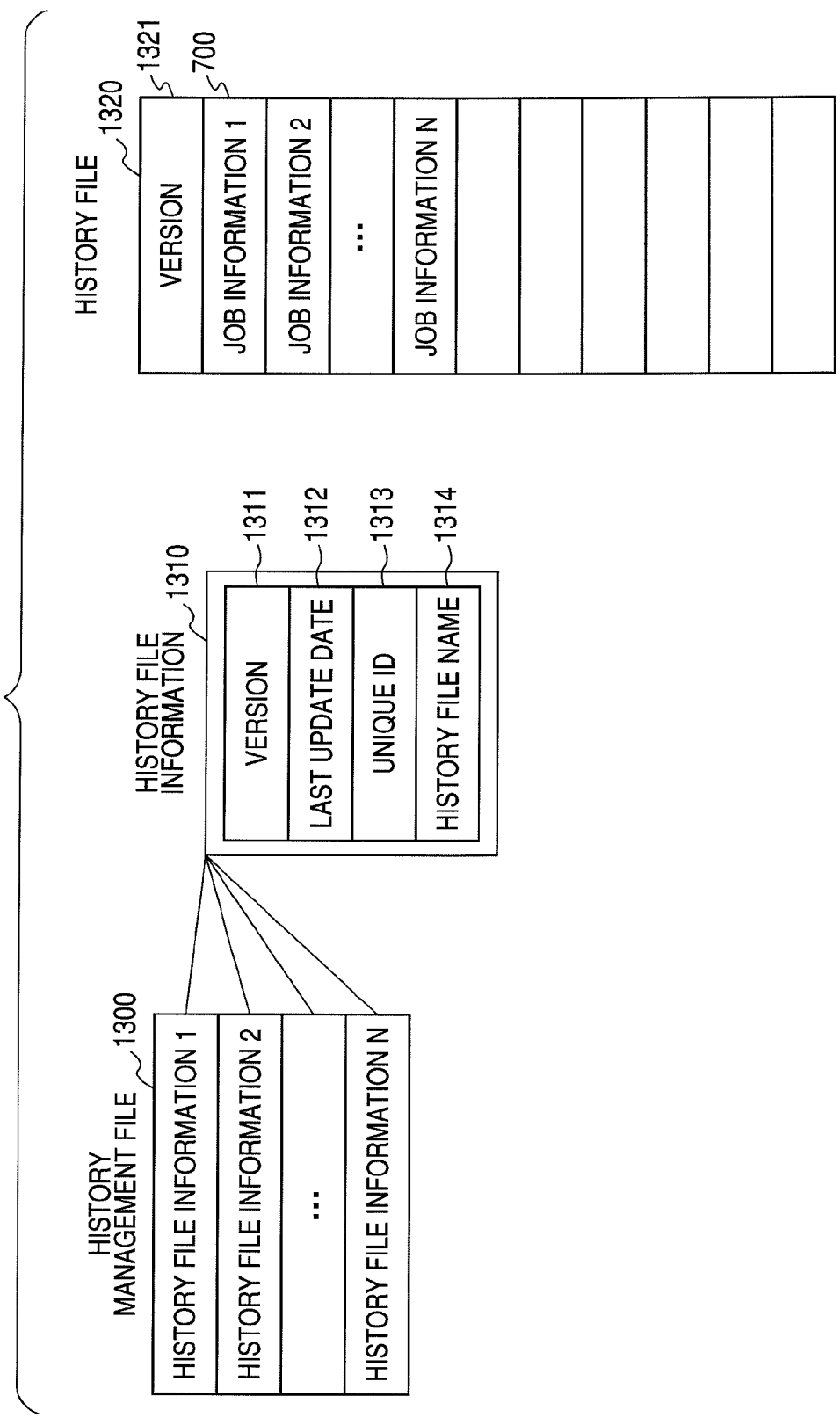
FIG. 13 is a drawing of a history file and a history-management file shown in FIG. 10.

FIG. 13 illustrates a history-management file 1300 and a history file 1320 generated by the history-managing unit 1014.

The history-management file 1300 is a list of multiple pieces of generated history-file information 1310. The history-file information 1310 contains a version of a history file 1311, a last update date 1312, a unique ID 1313 common with the connection list (FIG. 11), and a history-file name 1314 saved in the device storage 1002. The history-file name 1314 serves as information to specify a history file. In the history file, a version 1321 and the multiple pieces of job information 700 shown in FIG. 7 are saved.

In this embodiment, the device scheduler 103 generates history information as in FIG. 13. The printing-management server should detect that the state of a printing job has changed in a printing device and notify of the change in the printing job state. Even if the server 101 is not connected (not monitored), the scheduler can generate the history information. That is, job-state-change notification to be notified is saved, so that a saved job state can be notified if a request to acquire the job state is again received from the printing-management server 101.

Flow of Printing-Job Execution

Next, processing by the printing-management server 101 will be described. The processing is to accomplish monitoring large number of devices, populating large quantity of printing jobs, and tracking the jobs until completion, which are features of the present invention.

Figure 14:
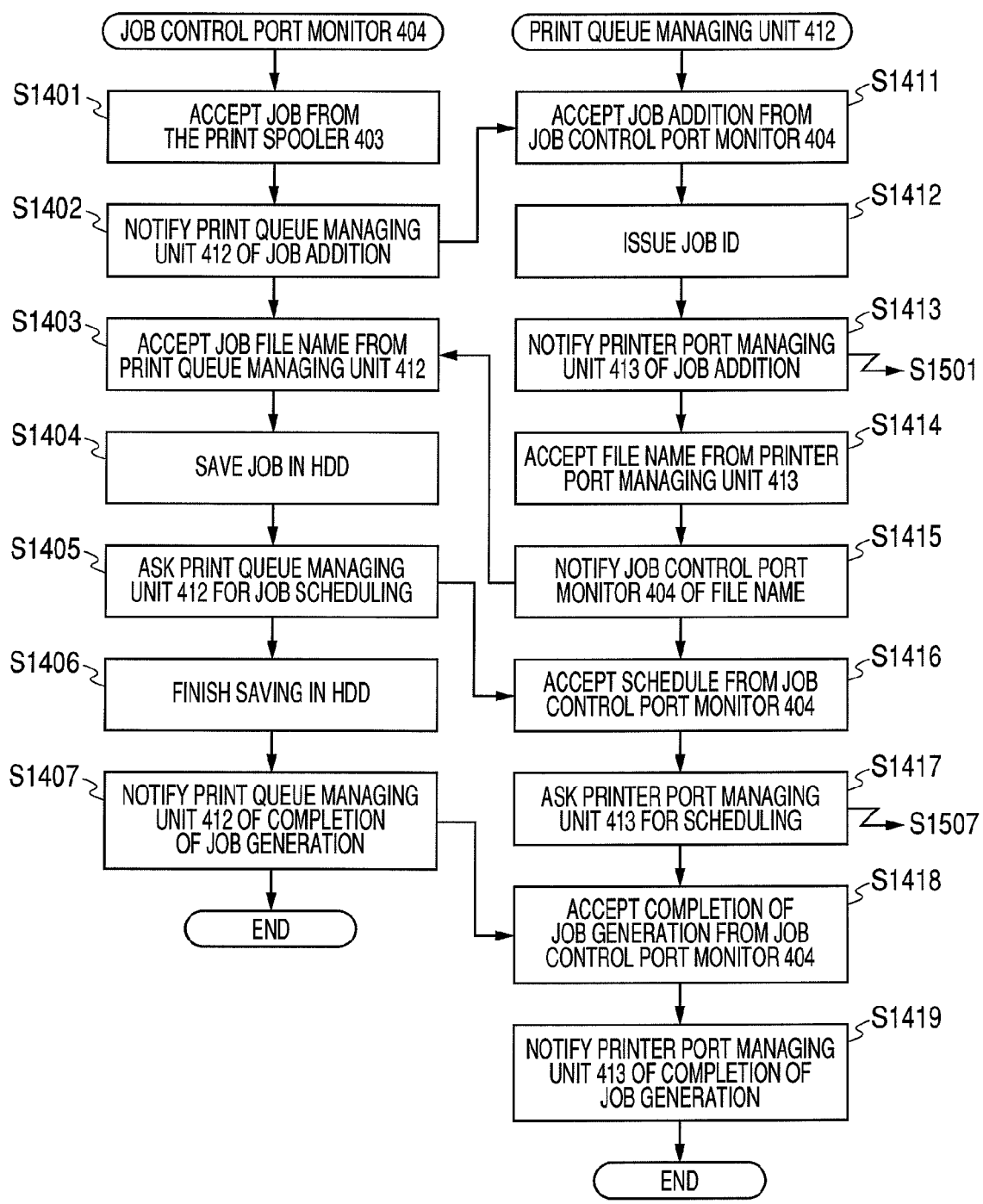
FIG. 14 is a flowchart illustrating processing by a job control port monitor 404 and a print-queue-managing unit 412.

Giving an outline, first, a flowchart in FIG. 14 is executed depending on a printing request and the job control port monitor 404 calls the print-queue-managing unit 412. Then, the print-queue-managing unit 412 calls the printer-port-managing unit 413 and a flowchart in FIG. 15 is executed.

Figure 15:
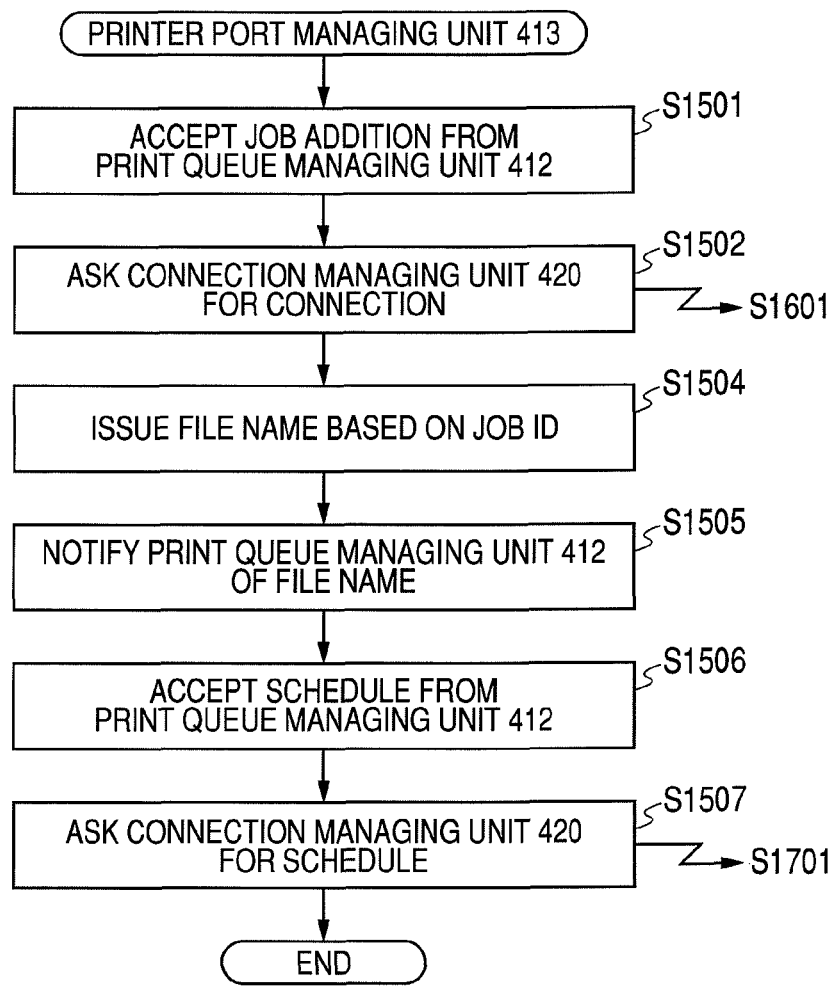
FIG. 15 is a flowchart illustrating the processing by a printer-port-managing unit 413.
Figure 16:
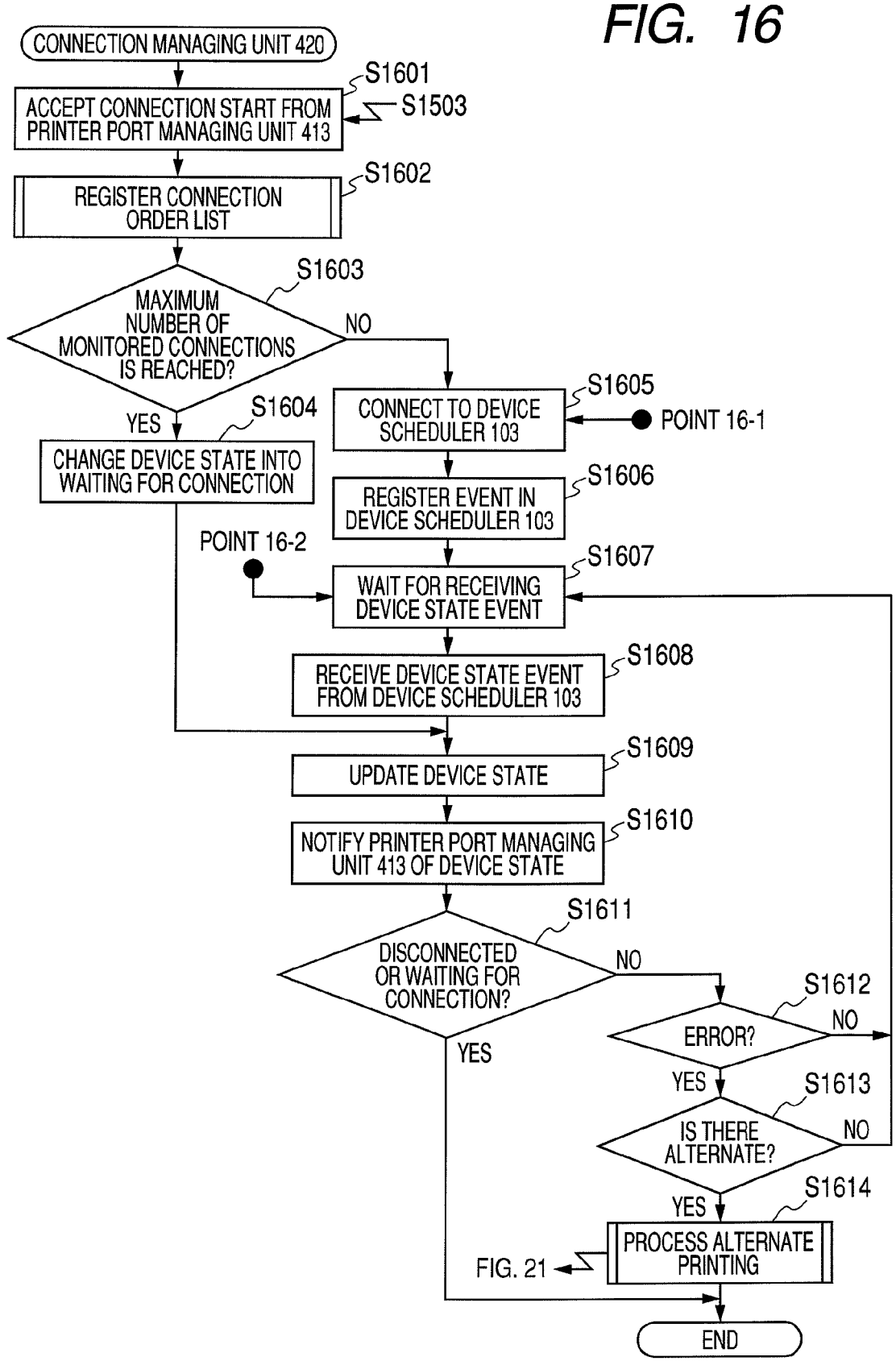
FIG. 16 is a flowchart illustrating connection-start processing by a connection-managing unit 420.
Figure 17:
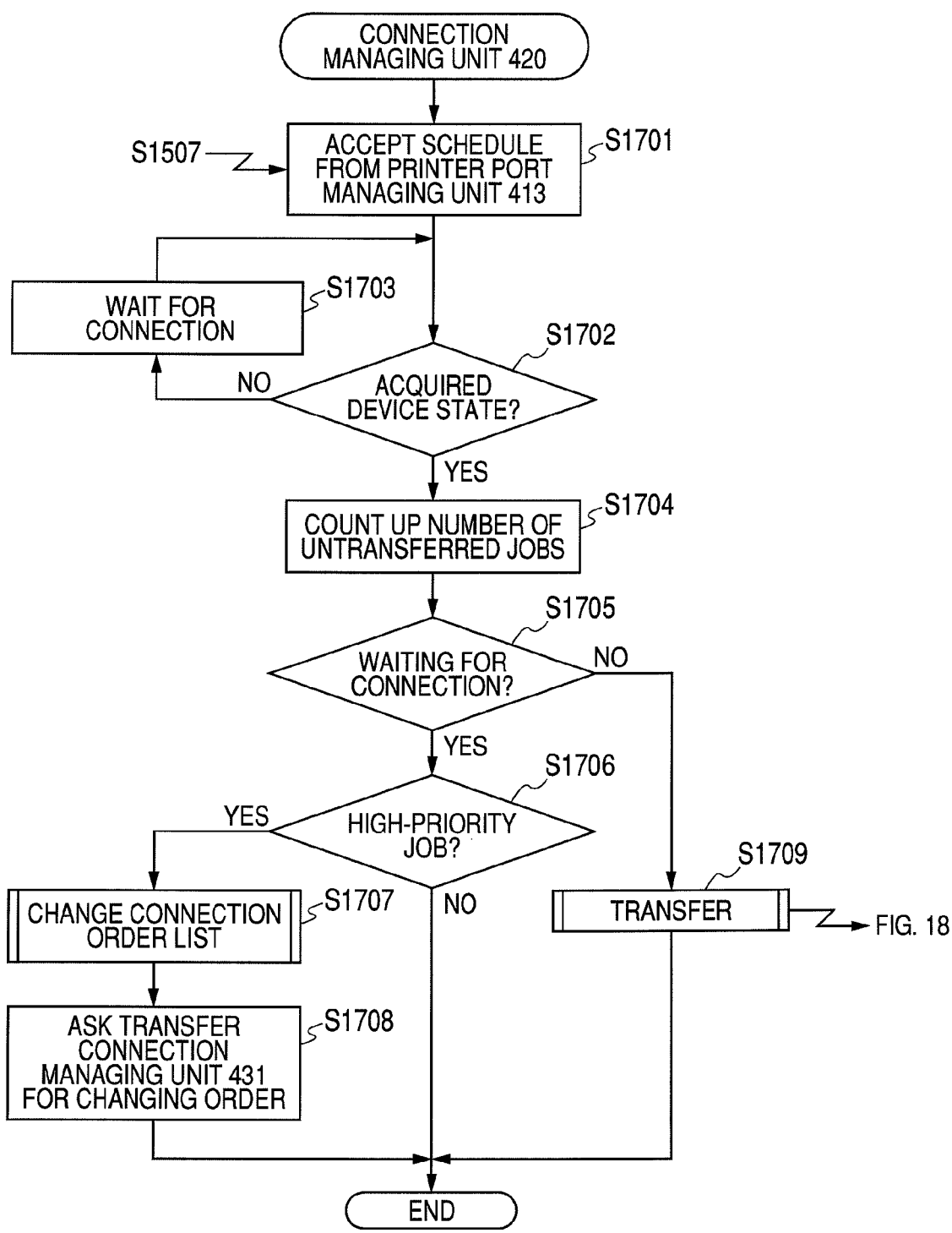
FIG. 17 is a flowchart illustrating schedule processing by the connection-managing unit 420.

In the flowchart in FIG. 15, the printer-port-managing unit 413 asks the connection-managing unit 420 for processing of connection to a device, and causes the connection-managing unit 420 to execute flowcharts in FIGS. 16 and 17.

Then, the connection-managing unit 420 monitors states of devices being connection destinations or candidate connection destinations according to the flowchart in FIG. 16, and transfers a printing job according to the flowchart in FIG. 17.

Figure 18:
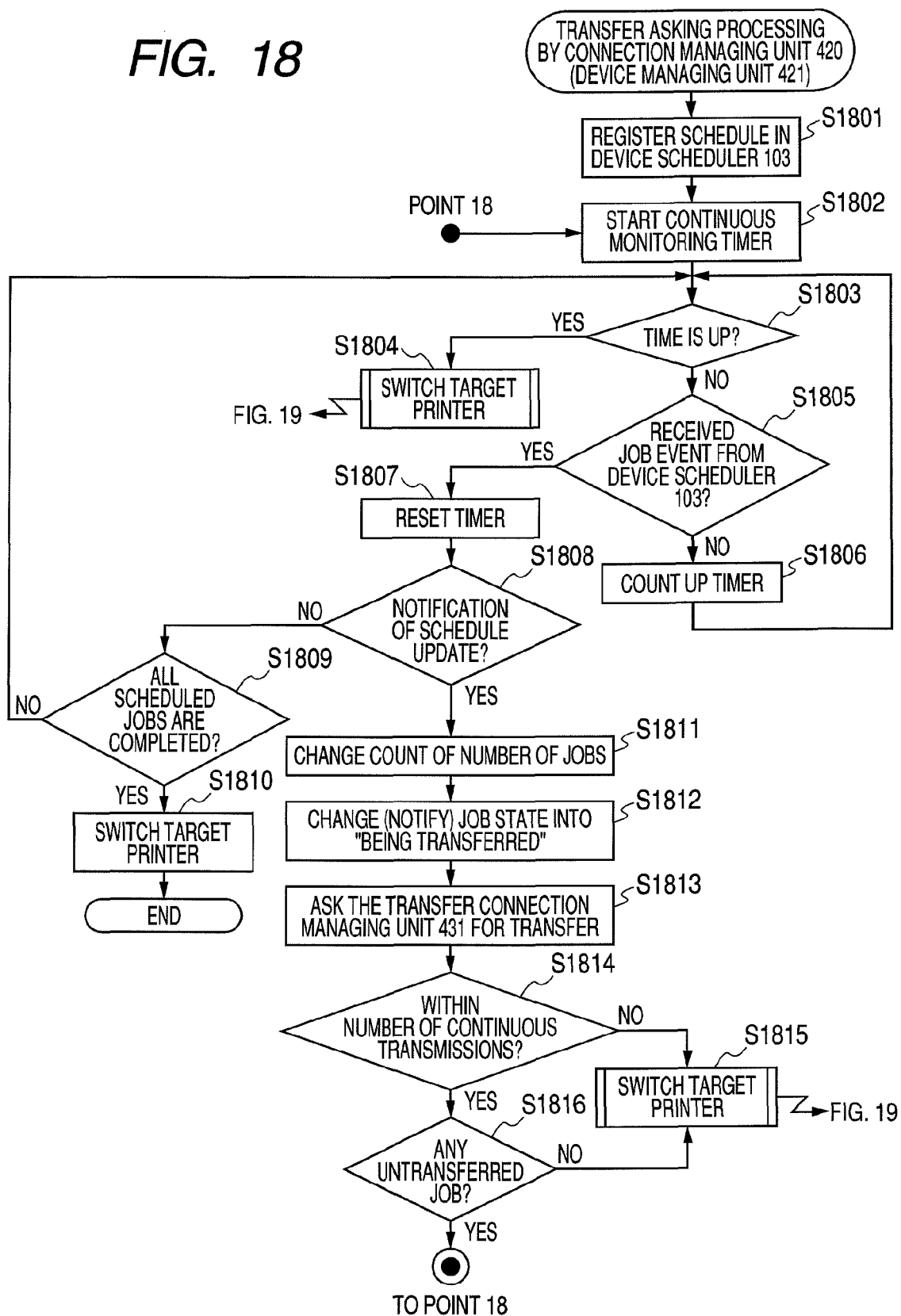
FIG. 18 is a flowchart illustrating job-transfer processing by a device-managing unit 421.
Figure 19:
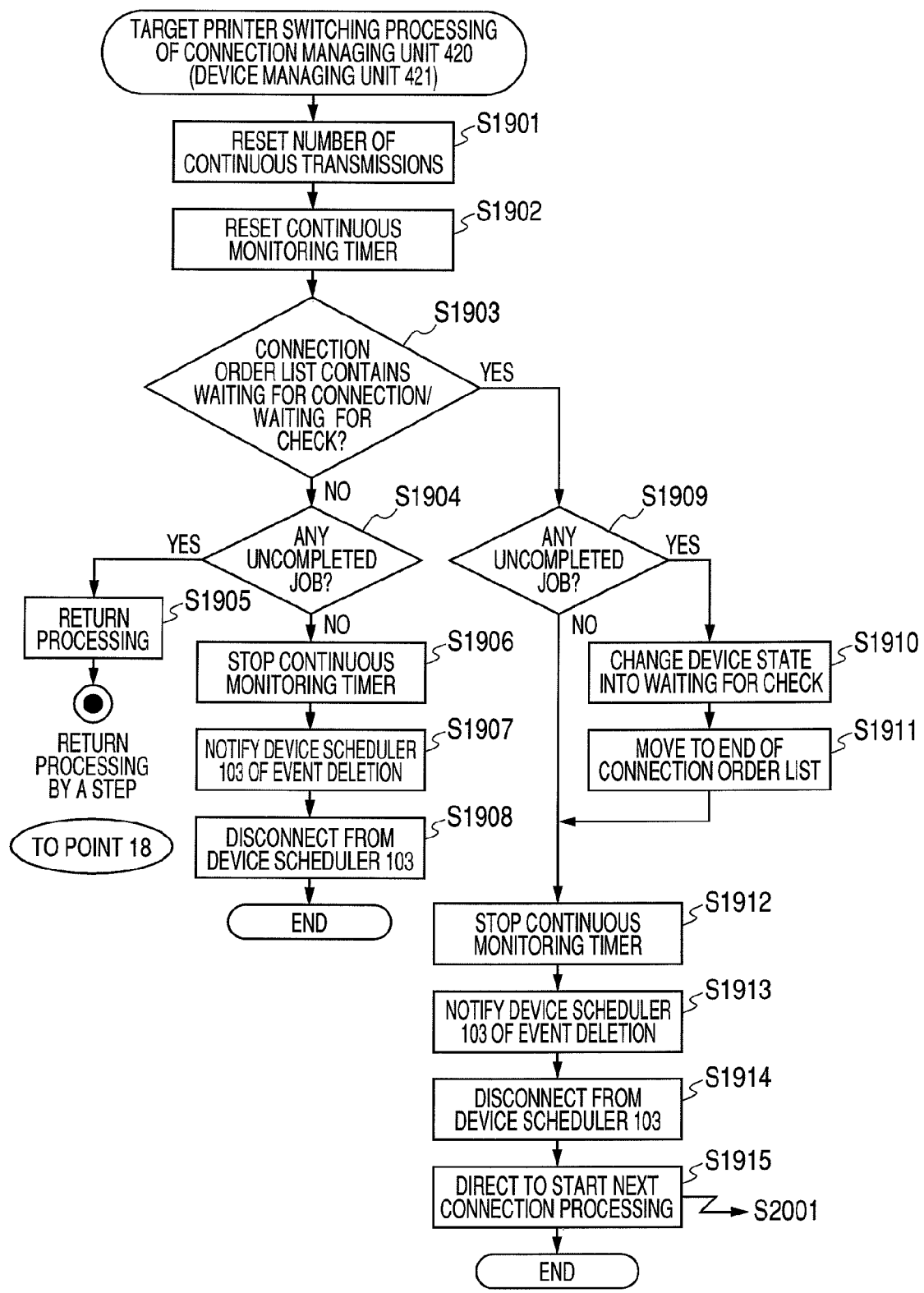
FIG. 19 is a flowchart illustrating target-printer-switch processing by the device-managing unit 421.
Figure 20:
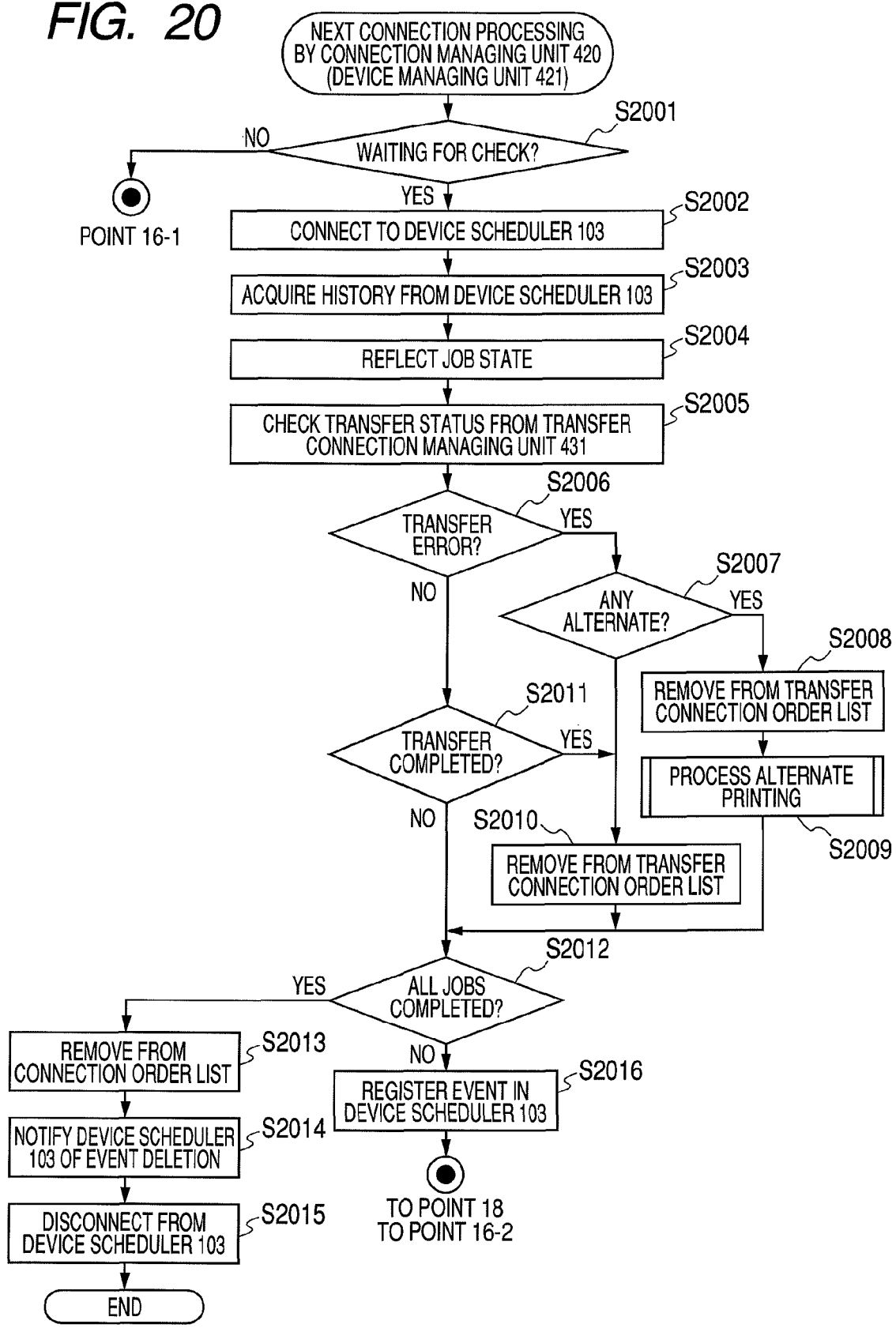
FIG. 20 is a flowchart illustrating processing of the next connection in a connection-order list by the device-managing unit 421.

Flowcharts in FIGS. 18, 19 and 20 illustrate details of the transfer processing in the flowchart in FIG. 17. The connection-managing unit 420 determines whether or not various types of specific conditions are satisfied according to the flowcharts in FIGS. 18, 19 and 20, and switches connection destination devices based on device registration in the connection-order list 800.

Figure 21:
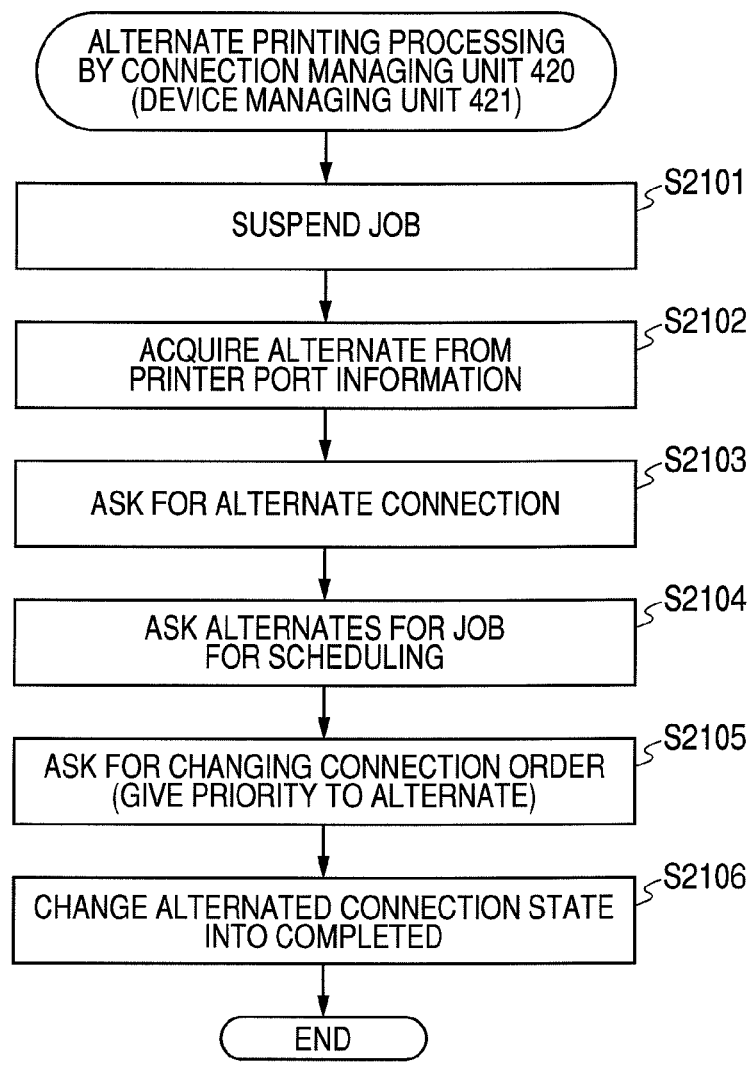
FIG. 21 is a flowchart illustrating alternate printing processing by the device-managing unit 421.

A flowchart in FIG. 21 illustrates details of alternate printing processing (S1614) performed based on the monitoring of the states of the respective devices in FIG. 16.

Figure 22:
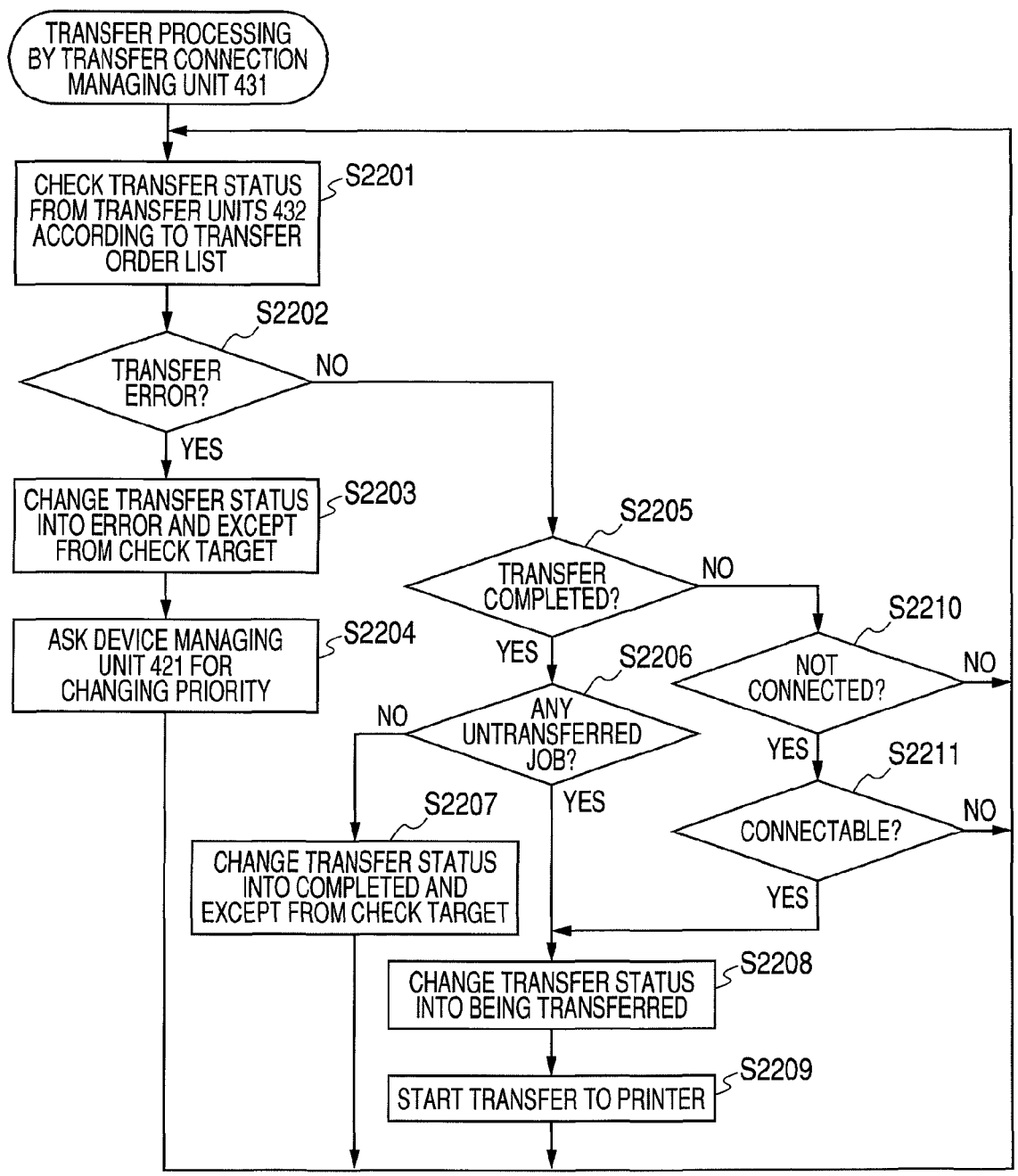
FIG. 22 is a flowchart illustrating transfer processing by a transferring-connection-managing unit 431.

A flowchart in FIG. 22 illustrates details of the transferring-connection-management processing described before in relation to the transfer-managing unit 430. When the request for transfer in the flowchart in FIG. 18 is accepted, a printing job is transferred according to the flowchart in FIG. 22. The following will describe details of the respective flowcharts.

Processing by Printing-Management Server 101

FIG. 14 is a flowchart illustrating the processing by the job control port monitor 404 and the print-queue-managing unit 412 when the general application 401 populates a printing job in the monitor 404 and the unit 412. The customizing application 406 populates the generated printing job in the print-queue-managing unit 412 through the API 407 by processing similar to that by the job control port monitor 404.

First, the job control port monitor 404 accepts a job from the print spooler 403 at S1401 and notifies the print-queue-managing unit 412 of job addition at S1402. At the step, the monitor 404 also notifies the unit 412 of a printer name. Then, the job control port monitor 404 accepts a job file name attached with a job ID from the print-queue-managing unit 412, and saves the job in the designated file name in the HDD 211 at S1404.

Next, the job control port monitor 404 asks the print-queue-managing unit 412 for job scheduling at S1405. At the step, the monitor 404 notifies the unit 412 of the job ID received from the print-queue-managing unit 412 at S1403. When the job file is saved in the HDD 211 at S1406, the job control port monitor 404 notifies the print-queue-managing unit 412 of the completion of job generation at S1407, and then finishes the processing. Also at the step, the monitor 404 notifies the print-queue-managing unit 412 of the job ID received from the unit 412 at S1403.

When the print-queue-managing unit 412 accepts the notification of job addition from the job control port monitor 404 at S1411, the unit 412 issues the job ID at S1412. Then, the unit 412 notifies the printer port of the job addition at S1413. At the step, the unit 412 notifies the port of the issued job ID. Next, the unit 412 accepts the job file name from the printer-port-managing unit 413 at S1414, and notifies the job control port monitor 404 of the name at S1415.

Then, when the print-queue-managing unit 412 accepts the job-schedule notification from the job control port monitor 404 at S1416, the unit 412 notifies the printer-port-managing unit 413 of the job schedule at S1417. At the step, the print-queue-managing unit 412 notifies the printer-port-managing unit 413 of the job ID issued at S1412.

When the print-queue-managing unit 412 is notified of the completion of job generation by the job control port monitor 404 at S1418, the print-queue-managing unit 412 notifies the printer-port-managing unit 413 of the completion of job generation at S1409, and then finishes the processing. Also at the step, the print-queue-managing unit 412 notifies the printer port-managing unit 413 of the job ID issued at S1412.

FIG. 15 is a flowchart illustrating the processing by the printer-port-managing unit 413 when the printing job is populated from the print-queue-managing unit 412 at S1413.

First, when the printer-port-managing unit 413 is notified of job addition by the print-queue-managing unit 412 at S1501, the unit 413 checks whether or not the printer has been connected and has acquired the device state by the connection-managing unit 420 at S1502. If the printer has not acquired the device state, i.e., the printer has not been connected to the device, then the unit 413 notifies the connection-managing unit 420 of connection start at S1503. At this step, the unit 413 notifies the unit 420 of printer-port information based on the printer designated at the printing request.

Next, the printer-port-managing unit 413 issues a job file name depending on the job ID accepted at S1504, and notifies the print-queue-managing unit 412 of a file name corresponding to the printing job at S1505.

When the printer-port-managing unit 413 is asked for scheduling by the print-queue-managing unit 412 at S1506, the unit 413 notifies the connection-managing unit 420 of scheduling at S1507, and finishes the processing. At the step, the printer-port-managing unit 413 notifies the connection-managing unit 420 of the job ID notified by the print-queue-managing unit 412.

FIG. 16 is a flowchart illustrating the processing by the connection-managing unit 420 when the unit 420 is notified of the connection start by the printer-port-managing unit 413.

When the connection-managing unit 420 is notified of the connection start by the print port-managing unit 413 at S1601, the unit 420 registers the connection information at the end of the connection-order list 800 described in relation to FIG. 8 through connection-order-list-registration processing at S1602. At S1602, printing devices, which are output destinations of a printing job to be transferred and whose state information is acquired, are sequentially registered in a connection-order list being a monitoring queue. The processing at S1602 updates the order list 800 (also referred to as the connection-order list 800) in FIG. 8. However, the re-registration in the monitoring queue at S1602 is not limited to registration at the end of the queue, which has been described as an example. The information can be registered somewhere other than the end of the list such that the printer can be again connected to a device. For example, information to be registered can be given the pre-determined priority at re-registration and registered at the top position according to the priority. If printing jobs to be transferred to a device designated in a printing request are sequentially generated, connection information of devices being output destinations of the printing jobs is sequentially registered in the connection-order list 800 being a monitoring queue.

Next, the number of monitoring-connected devices being connected in the connection-order list 800 at S1603 is compared to the maximum number of monitoring connections being set. If the number of connections reaches the maximum number of monitoring connections, then the sum of the number of monitoring-connected devices and the number of transfer-connected devices in the transferring-connection-order list 900 is compared to the maximum number of connections being set. If the total number of connections reaches the maximum number of connections, then the device state is changed to "waiting for connection" at S1604 and the processing proceeds to S1609. Otherwise, if the number of connections and the total number of connections do not reach the maximum number of monitoring connections and the maximum number of connections, respectively, then the device-managing unit 421 executes connection processing.

The device-managing unit 421 starts the connection processing, and notifies the device scheduler 103 corresponding to a printer port of the connection at S1605. More particularly, the unit 421 connects to a printing device according to the registration order of printing devices in the connection-order list 800 (monitoring queue) and acquires state information from the printing device. The state-acquisition processing will described below in detail in relation to a flowchart. At the step, the unit 421 notifies the scheduler 103 of a unique ID being set. After the connection succeeds, the device-managing unit 421 registers an event in the device scheduler 103 at S1606. Then, the device-managing unit 421 waits to receive the device-state-change event notified by the device scheduler 103 at S1607.

When the device-managing unit 421 acquires the device state from the device scheduler 103 at S1608 or sets the device state to waiting at S1604, the unit 421 updates the device state managed internally at S1608. Next, the unit 421 notifies the printer-port-managing unit 413 of the updated device state at S1610.

A method of acquiring the device state at S1606 and S1607 can be replaced with processing of polling a device to be monitored and waiting a polling response, for example. The processing at S1606 and S1607 can be various types of methods to monitor a device. Such a method can be any method of monitoring various types of information of a device to be monitored, in which the information is registered in the connection-order list 800 via a network.

The device-managing unit 421 determines the updated device state is "disconnected" or "waiting for connection" at S1611. If the state is either of them, the unit 421 finishes the processing. Otherwise, if the device state is neither of them, the unit 421 determines whether or not the device state is "error" at S1612. The "error" herein indicates a state that printing output cannot be continued due to out of supply such as paper or toner, paper jam, software hang-up, for example. If the unit 421 determines that the state is not "error" at S1612, the unit 421 returns the processing to S1607. Otherwise, if the unit 421 determines that the state is "error" at S1612, the unit 421 determines whether or not a backup printer is set in the acquired printer-port information at S1613. If a backup printer is set, the unit 421 moves the processing to alternate printing processing described later in detail in relation to FIG. 20 at S1614 and finishes the processing. Otherwise, if a backup printer is not set, the unit 421 returns the processing to S1607.

FIG. 17 is a flowchart of processing by the connection-managing unit 420 when the unit 420 is asked for scheduling by the printer-port-managing unit 413 according to the flowchart in FIG. 15. The scheduling notification by the printer-port-managing unit 413 corresponds to S1507 in the flowchart in FIG. 15 described in the above.

The connection-managing unit 420 accepts the scheduling notification from the printer-port-managing unit 413 at S1701. At S1702, the device-managing unit 421 determines whether or not the device state of a device to be connected has been acquired. More particularly, the unit 421 determines at S1702 whether or not the device state is "disconnected". If the device state has not been acquired, i.e., the device state is "disconnected", then the unit 421 waits to connect to the device at S1703. Otherwise, if the unit 421 determines to be YES at S1703, the unit 421 counts up the number of jobs that have not been transferred in the connection-order list at S1704.

Next, the device-managing unit 421 determines at S1705 whether or not the device state is "waiting for connection". If the device state is "waiting for connection", the unit 421 checks priority setting of a scheduled printing job at S1706. If the priority is higher than the normal, the connection-order control unit 422 changes the connection-order list at S1707. In the connection-order-list-change processing, the unit 422 changes the priority of the connection in the connection-order list and sorts jobs listed as being "waiting for connection" in the priority order. After the unit 422 asks the transferring connection-managing unit 431 for changing the order the transferring connection-order list 900 to perform transferring connection by priority at S1708, the unit 422 finishes the processing. If the priority of a scheduled printing job is at or below the normal, the unit 422 finishes the processing.

In the connection-order-list-change processing by the connection-order-control unit 422, the priority being set can be the sum, maximum or average of priorities of all scheduled jobs. That is, setting of a condition policy to give priority to the connection order decides the behavior. For example, when the sum of job priorities is used, the sum of priorities of jobs scheduled for the respective devices is stored, and each time a job is scheduled, the priority is added and the connection-order list is sorted according to the value.

If it is determined at S1705 that the device state is not "waiting for connection", the device-managing unit 421 starts transfer processing described below at S1708. If the device state is "waiting for check", the device-managing unit 421 determines to be NO at S1705.

FIG. 18 is a flowchart illustrating the processing by the device-managing unit 421 when the device-managing unit 421 starts the job-transfer processing. More particularly, it is determined whether or not a specific condition is satisfied to determine whether or not to interrupt monitoring of a device. If it is determined that the specific condition is not satisfied and a device to be monitored should not be changed, the unit 421 asks the transferring-connection-managing unit 431 for transfer of a printing job. The job-transfer-ask processing herein is a broad term including various types of processing to transfer a printing job such as processing to ask the transferring-connection-managing unit 431 for transfer of a printing job and processing to request to schedule a printing job.

First, the device-managing unit 421 notifies the device scheduler 103 corresponding to a printer port of schedule registration along with job information at S1801.

Next, the device-managing unit 421 starts a timer for continuous monitoring of the device at S1802. Next, it is determined at S1803 whether or not the continuous monitoring timer indicates that time is up. Particularly, it is determined whether or not it is the time limit for continuous monitoring being set in the printer-port information 600. If it is determined at S1803 that time is up, target-printer switching is executed at S1804 that will be described later in relation to FIG. 19 to interrupt monitoring of a printing device.

If it is determined at S1803 that time is not up, it is determined at S1805 whether or not a job-state-change event is received from the device scheduler 103. If the job-state-change event is not received at S1805, the timer is counted up at S1806 and the unit 421 returns the processing to S1803.

When the device-managing unit 421 receives the job-state-change event from the device scheduler 103 at S1807, the unit 421 resets the continuous monitoring timer and determines whether or not the received event is "schedule update", i.e. printing permission at S1808. If the received job-state-change event is not "schedule update", the unit 421 determines at S1809 whether or not all the printing jobs registered in the print queue have been completed. If not all the printing jobs registered in the queue have been completed, the unit 421 returns the processing to S1803. If all the printing jobs registered in the current print queue have been completed, then the unit 421 performs target-printer switching in FIG. 19 to interrupt monitoring of a printing device at S1810 and finishes the processing.

When the device-managing unit 421 determines at S1808 that "schedule update" is received from the device scheduler 103, the unit 421 counts down the number of jobs that have not been transferred in the connection-order list and counts up the number of transferred jobs at S1811. Next, the unit 421 changes the job state into "being transferred" and notifies the printer-port-managing unit 413 of the change at S1812. Next, the unit 421 asks the transferring-connection-managing unit 431 for starting transfer of a printing job at S1813. At the step, the device-managing unit 421 notifies the transferring-connection-managing unit 431 of printer-port information and a job ID of a transfer destination. For asking the transfer start in this embodiment, a printer is registered as being in a state "waiting for transfer" in the transferring connection-order list 900 managed by the transferring-connection-managing unit 431. At the step, if the printer has been registered in the transferring-connection-order list 900, the number of jobs that have not been transferred in registered printer information is counted up. A method of asking for transfer start can be implemented as processing to notify the transferring-connection-managing unit 431 of a message.

The device-managing unit 421 compares the number of transferred jobs being counted up to the number of continuous transfers being set in printer-port information at S1811. If it is determined at S1814 that the number of transferred jobs reaches the number of continuous transfers, the unit 421 executes the target-printer switching in FIG. 19 to interrupt monitoring of a printing device at S1815. If it is determined to be NO at S1814, the unit 421 executes the flow in FIG. 19, as describe later in detail. If it is determined to be YES (i.e., a further registration job is waiting) at S1903, the unit 421 checks whether or not a candidate device to be at the end of the list has an incomplete printing job at S1909. If it is determined to have any incomplete printing job, the job is registered at the end of the list at S1911. Then, the unit 421 directs to start the next (the fourth printer in FIG. 8 which is in a state other than "connected") connection processing at S1915. Finally, step S1915 is executed in the flowchart in FIG. 19, connection to a printing device can be sequentially switched according to the registration order in the connection-order list 800 and state information acquired from the printing device can be acquired even if transfer of a printing job is not completed.

If the number of transferred jobs does not reach the number of continuous transfers, it is determined at S1816 whether or not there are any jobs that have not been transferred. If there is no such job, the target-printer-switch processing in FIG. 19 is executed at S1815. Otherwise, it is determined at S1816 that there is a job that has not been transferred, the unit 421 returns the processing to S1802.

FIG. 19 is a flowchart illustrating the processing to interrupt monitoring of a printing device and re-registration of the monitor-interrupted device in a monitoring queue (the connection-order list 800) by the device-managing unit 421 when the target-printer-switch processing starts.

First, the device-managing unit 421 starts the target-printer-switch processing at S1901, resets the number of continuous transmissions in the connection-order list, and resets the continuous monitoring timer at S1902.

The device-managing unit 421 determines whether or not a device is in a state of "waiting for connection" or "waiting for check" in the connection-order list at S1903. If no such device is in the connection-order list, the unit 421 determines at S1904 whether or not the print queue contains an uncompleted job. If there is any uncompleted job, the unit 421 returns the processing to a caller of the printing-switch-processing at S1905. If there is no uncompleted job, the unit 421 stops the continuous-monitoring timer at S1906, and directs to delete an event registered in the device scheduler 103 at S1907. Then, the unit 421 notifies the device scheduler 103 of disconnection at S1908, updates the device state to "disconnected" and finishes the processing.

Otherwise, if it is determined at S1903 that the connection-order list contains a device in a state of "waiting for connection" or "waiting for check", the device-managing unit 421 determines at S1909 whether or not a print queue to be monitored (whose monitoring is to be interrupted) contains further uncompleted printing jobs. If the unit 421 determines at S1909 that there is any uncompleted printing job, the unit 421 changes the device state into "waiting for check" at S1910, and moves the position to the end of the connection-order list at S1911. The re-registration processing on the monitoring queue at S1911 is the registration at the end of the queue for example, but the present invention is not limited to it. The registration can be done anywhere other than the end of the queue if a printer can again connect to a device. For example, a pre-determined priority can be given to a job to be registered at the re-registration, and the job can be registered at the front position according to the priority. The processing at S1911 again re-registers a monitoring-interrupted device at the end of the monitoring queue (the connection-order list 800), thereby the device can be monitored again depending on the registration status registered in the monitoring queue.

Then, the unit 421 stops the continuous-monitoring timer at S1912, and directs deletion of an event registered in the device scheduler 103 to interrupt monitoring of a printing device at S1913. Then, the unit 421 notifies the device scheduler 103 of disconnection at S1914, directs start of processing to connect to a device listed on the next place in the connection-order list at S1915, changes the device state into "disconnected" and finishes the processing.

FIG. 20 is a flowchart illustrating the processing by the device-managing unit 421 when the device-managing unit 421 directs the next-connection processing in the connection-order list 800 in FIG. 8. The processing in FIG. 20 applies to processing in the case that monitoring is interrupted, a device is re-registered in the printing monitoring queue, and connection processing is again performed.

First, the device-managing unit 421 determines at S2001 whether or not the state of a device listed on the next place in the connection-order list 800 is "waiting for check". If the state is not "waiting for check", the flow proceeds to the point 16-1 (S1605) in FIG. 16 to process normal connection. Otherwise, if the state is "waiting for check", the unit 421 connects to the device scheduler 103 corresponding to a printer port (the lower leftmost of the printing-managing unit 410) at S2002. More particularly, the unit 421 connects to printing devices according to the registration order of the printing devices in the connection-order list 800 (monitoring queue) and acquires state information from the printing devices similarly to S1605. At the step, the unit 421 notifies of a unique ID being set. After the connection succeeds, the device-managing unit 421 notifies the device scheduler 103 of history acquisition and acquires the history maintained by the device scheduler 103 at S2003. Processing by a device corresponding to the acquisition processing at S2003 will be described in detail in relation to FIG. 24. At S2004, the unit 421 updates the job state (the job information 705, 708 and 709 in FIG. 7) based on the next acquired history.

Next, the device-managing unit 421 checks the status of transfer to the printer through the transferring connection-managing unit 431 at S2005. At S2006, the unit 421 determines whether or not the transfer status is a transfer error. If YES, i.e. the status is transfer failure, then the unit 421 decides at S2007 whether or not to perform alternate printing based on determination similar to S1613 in FIG. 16. If the alternate printing is executed according to the determination at S2007, the unit 421 removes information of connection to the printer from the transferring connection-order list 900 at S2008, and moves the processing to alternate printing processing in FIG. 21 at S2009. If it is determined at S2007 not to perform the alternate printing, the unit 421 also removes information of connection to the printer from the transferring connection-order list 900 at S2010, sets the state of a printing job to an error and moves the processing to the next step S2012.

If it is determined at S2006 that the transfer causes no error, the unit 421 determines at S2011 whether or not the transfer has been normally completed. If NO, i.e. the job is "being transferred" or the transferring connection-order list 900 does not contain the printer registration, the unit 421 moves the processing to S2012. If it is determined at S2011 that the transfer is completed, the unit 421 removes connection information of the printer from the transferring connection-order list 900 at S2010, and the processing moves to S2012.

The device-managing unit 421 determines at S2012 whether or not all jobs registered in the print queue have been completed based on an updated job state. If all jobs have been completed, the unit 421 removes information of the device from the connection-order list at S2013. Next, the unit 421 notifies the device scheduler 103 of deletion of a registered event at S2014. Then, the unit 421 notifies the device scheduler 103 of disconnection at S2015, sets the state of connection to the device to "disconnected" and finishes the processing.

If not all the jobs registered in the print queue have been completed, then the device-managing unit 421 notifies the device scheduler 103 of event registration at S2016, and moves the processing to the point 18 in FIG. 18 and the point 16-2 in FIG. 16. Afterward, at least the processes in the flowcharts in FIGS. 16 and 18 are executed in parallel.

FIG. 21 is a flowchart illustrating the processing by the device-managing unit 421 when the device-managing unit 421 executes alternate printing processing.

When the alternate printing processing starts, the device-managing unit 421 suspends at S2101 all jobs registered in the print queue corresponding to a device that has caused an error. Next, the unit 421 acquires backup-printer information being set in printer-port information at S2102. Next, the unit 421 registers schedules of all the jobs registered in the printer queue in an alternate printer at S2103. Next, the unit 421 removes all jobs registered in an alternate printer queue at S2104, and sets the states of the removed jobs to completed state. Then, the unit 421 inserts the alternate device to the front column of "waiting for connection" or "waiting for check" in the connection-order list 800 at S2105. Finally, the unit 421 executes target-printer-switch processing and accomplishes the alternate printing processing at S2106.

Transfer-Control Processing on Printing Job

FIG. 22 is a flowchart illustrating the processing to control transfer of a printing job to a printer by the transferring-connection-managing unit 431. The processing applies to processing to transfer printing jobs according to the registration order of printing devices to transfer a printing job registered in the transferring-connection-order list 900 (transferring queue).

The transferring-connection-managing unit 431 checks transfer statuses of the corresponding transfer unit 432 sequentially from the highest level in the transferring-connection-order list 900 at S2201, and determines at S2202 whether or not transfer causes an error. If transfer causes an error, first, at S2203, the unit 431 sets the transfer status of the printer in the transferring-connection-order list 900 to transfer error and excepts the printer from check targets at S2201. Then, the unit 431 asks the device-managing unit 421 to raise the monitoring connection rank at S2204, and returns the processing to S2201 to check the next place in the transferring-connection-order list 900.

If transfer causes no error at S2202, the unit 431 checks at S2205 whether or not the transfer has been completed. If the transfer has been completed, the unit 431 determines at S2206 whether or not a further job that has not been transferred remains. If no such a job remains, the unit 431 sets the transfer status to completed at S2207, excepts the printer from check targets at S2201 similarly to S2203, and returns the processing to S2201. If any job that has not been transferred remains at S2206, the unit 431 sets the transfer status to "being transferred" to continue the processing (S2207), and starts transfer of the next job. In other words, the transfer unit 432 starts transferring job data based on a job ID at S2208 (S2209), and returns the processing to S2201 to check the next place in the transferring-connection-order list 900.

If transfer has not been completed at S2205, the unit 431 determines at S2210 whether or not the state is "unconnected". If NO, i.e. the state is "being transferred", the unit 431 returns the processing to the check of the next place in the transferring-connection-order list 900 at S2201. If the state is "unconnected" at S2210, the unit 431 determines at S2211 whether or not new transferring connection is possible. If the transferring connection is not possible, the unit 431 returns the processing to S2201. If the unit 431 determines at S2211 that the transferring connection is possible, the unit 431 sets the transfer status of the printer in the transferring-connection-order list 900 to "being transferred" at S2208. Then, the unit 431 generates the corresponding transfer unit 432 to start transfer at S2209 and transfers a printing job. The processing at S2209 actually transfers a printing job according to the registration order of printing devices to transfer a printing job registered in the transferring-connection-order list 900 (transferring queue).

Next, the unit 431 notifies the transfer unit 432 of the printer-port information and the job ID generated at S2210 to start transfer, and returns the processing to S2201 to check the next place.

In the determination at S2211 whether or not connection is possible, the number of transfer-connected devices being connected in the transferring-connection-order list 900 is compared to the maximum number of transferring connections being set. If the number of connections reaches the maximum number of transferring connections, then the sum of the number of transfer-connected devices and the number of monitoring-connected devices in the connection-order list 800 is compared to the maximum number of connections being set. If the total number of connections reaches the maximum number of connections, it is determined that connection is impossible. Otherwise, if the number of connections and the total number of connections do not reach the maximum number of transferring connections and the maximum number of connections, respectively, then it is determined that connection is possible. The transferring-connection-managing unit 431 performs processing depending on the transfer status sequentially according to the registration order in the transferring-connection-order list 900 as the above, thereby controlling the order of the printing-job transfer to a printer.

The flowchart in FIG. 22 can be executed not depending on the processing at S1914 and S1915, but printing job can be continued to be transferred to a printing device that is transferring a printing job even if the target-printer-switch processing at S1804 and S1815 is performed.

Relation Between Transferring Connection and Monitoring Connection

Figure 25:
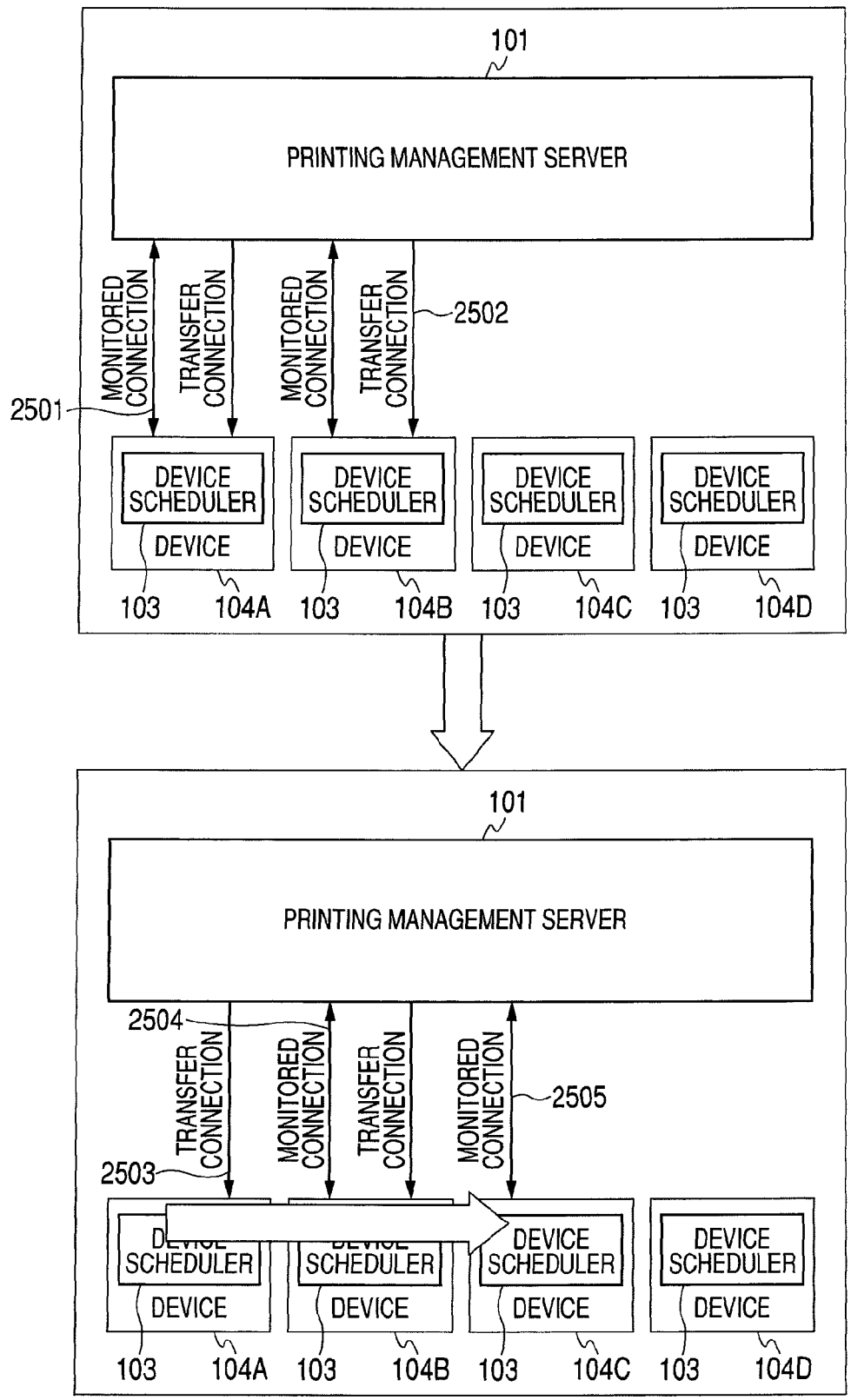
FIG. 25 is a schematic depiction of target-printer-switch processing by a printing system according to the embodiment.

FIG. 25 is a schematic depiction of the target-printer switching. In the upper block in FIG. 25, the server transfers a job to the device 104A through monitoring connection and transferring connection to the device 104A. The server performs similar processing on the device 104B.

FIG. 26 is a drawing of transition examples of the connection-order list 800 and the transferring-connection-order list 900 when the target-printer switching in FIG. 25 occurs.

First, monitoring-connection processing (2501 and 2504) will be described with reference to the flowcharts described before. Event reception is waited that informs the change in the device state from the device scheduler 103 at S1607 in the flowchart in FIG. 16. Then, the alternate printing processing at S1614 is performed based on the result of the event reception or the state transits to "disconnection" or "waiting for connection" according to the determination at S1611 and then the processing finishes or returns to step S1607. In the monitoring-connection processing, monitoring connection is performed sequentially on respective devices even if transfer of a printing job does not finish by actual transferring connection.

The state of the device 104A in the order 1 and the state of the device 104B in the order 2 in a list 2601 in the connection-order list 800 in FIG. 26 are "connected". This indicates that the states are "being monitoring-connected".

In the transfer processing, first, event reception is waited that informs the change in the job state from the device scheduler 103 at S1805 in the flowchart in FIG. 18. Then, the transferring-connection processing is performed after a schedule is updated according to the determination at S1808 based on the result of the event reception. The transfer processing on all scheduled jobs is completed and the target-printer-switch processing is performed according to the determination at S1809, or the processing returns to S1803.

In the transferring-connection processing (2502), the transfer status is checked through the transfer unit 432 at S2201 in the flowchart in FIG. 22 and transfer-error processing at S2203 is performed based on the check result. All transfer is completed and excepted from check targets according to the determination at S2206, and the processing returns to step S2201.

The above status is indicated by the fact that state of the device 104A in the order 1 and the state of the device 104B in the order 2 in a list 2603 in the transferring-connection-order list 900 in FIG. 26 are "being transferred".

If the number of jobs continuously transferred to the device 104A reaches the number of continuous transfers being previously set, i.e. it is determined to be No at S1814 in FIG. 18, the printing-switch processing occurs. Otherwise, if continuous monitoring time is reached, i.e. it is determined to be Yes at S1803 in FIG. 18, the printing-switch processing in FIG. 19 occurs. If the printing-switch processing occurs, the processing proceeds to the state of the lower block in FIG. 25. At the step, if the state of transferring connection to the device 104A is "being transferred", the transferring connection to the device 104A is continued while only monitoring connection is disconnected and monitoring connection to the next place (the device 104C being not connected in FIG. 25) is started.

The above processing is accomplished through determination that the state of the device 104C of the order 3 in the list 2601 in the connection-order list 800 in FIG. 26 at S1903 the flowchart in FIG. 19 is "waiting for connection" and moving to S1909.

Since not all jobs sent to the device 104A have been completed, the jobs are inserted to the order 4 in a list 2602 in the connection-order list 800 in FIG. 26 in the connection state of "waiting for check" through S1910 and S1911. Then, connection processing on the device 104C in the next connection processing in FIG. 20 is performed.

Since transfer to the device 104A has not been completed, the transfer processing in FIG. 22 continues the transfer (2503) to check the transfer status regularly until completion. Therefore, the transferring-connection-order list 900 does not transit as in 2604 in FIG. 26.

Figure 27:
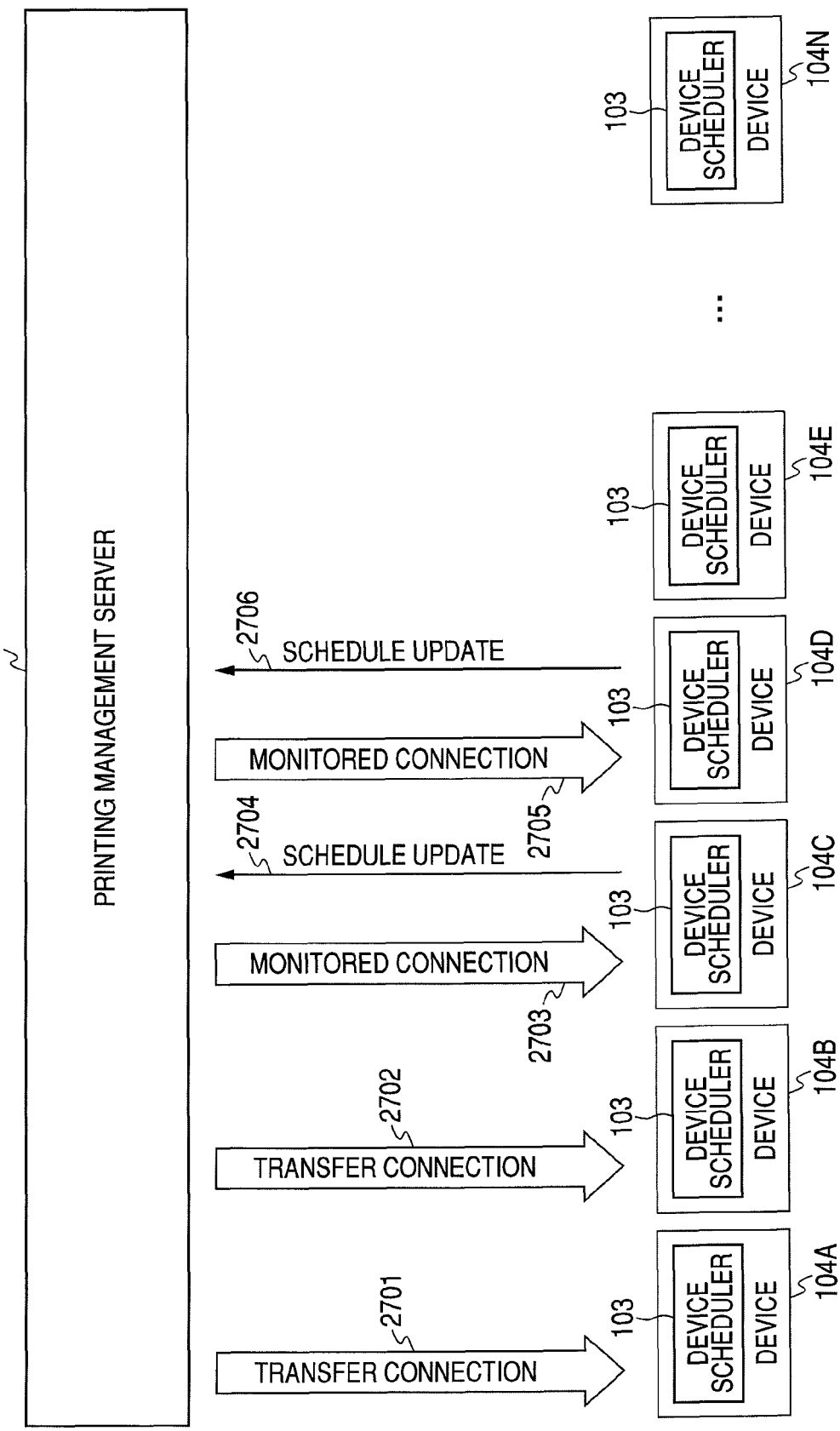
FIG. 27 is a schematic depiction of target-printer-switch processing by the printing system according to the embodiment.

The case of the state of the transferring connection to the device 104A is "being transferred" includes, for example, grouping job transmission to transmit a plurality of job collectively during the connection of a session, a job with very large amount of data taking a long time for transfer, and the like. FIG. 27 is a schematic depiction of further target-printer switching. By the monitoring-connection processing in 2505 in FIG. 25 (2703 and 2705 in FIG. 27), schedule update (2704 and 2706) without the transferring connection can be acquired from the device scheduler 103, as shown in FIG. 27.

Processing by Device Scheduler 103

Figure 23:
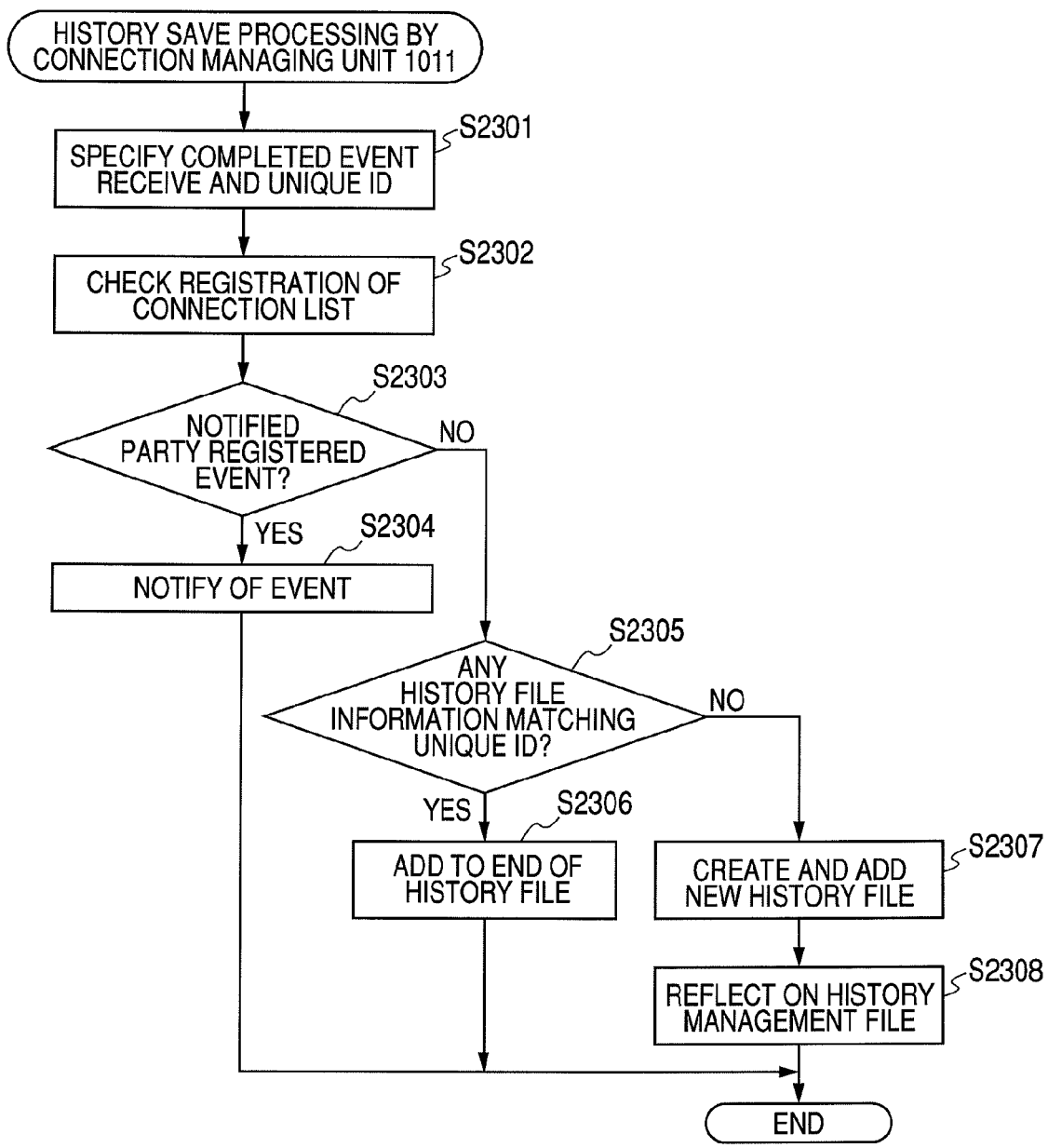
FIG. 23 is a flowchart illustrating history-save processing by the device scheduler 103.

FIG. 23 is the processing flow when history-save processing occurs in the device scheduler 103.

When the device scheduler 103 receives a job-completed event from the device controller 1001 at S2301, the scheduler 103 specifies the corresponding unique ID. Then, the scheduler 103 checks registration in the connection list (FIG. 11) using the specified unique ID as a key at S2302.

Next, it is determined at S2303 whether or not a notified party of the job-completed event that has populated a job has registered the event. More particularly, the unique ID corresponding to the completed event is compared to a unique ID contained in the connection list to determine whether or not the IDs match to each other.

If it is determined that a matching ID is registered, the completed-event notification is notified to a relevant computer among one or more connected computers using the unique ID as a key at S2304. Then, the processing finishes.

If a notified party of the job-completed event has not registered the event or is not connected, it is determined at S2305 whether or not history-file information corresponding to the unique ID corresponding to the completed event specified at S2301 has been registered in the history-management file.

If the information has been registered, the completed event is attached to the end of a history file associated with the history-file information at S2306 (a history-file name 1314). The attached completed event is a history that the job has finished.

If the information has not been registered, a new history file is created and the completed event is added at S2307. Finally, the new created history file is registered in the history-management file at S2308 and the processing finishes.

Figure 24:
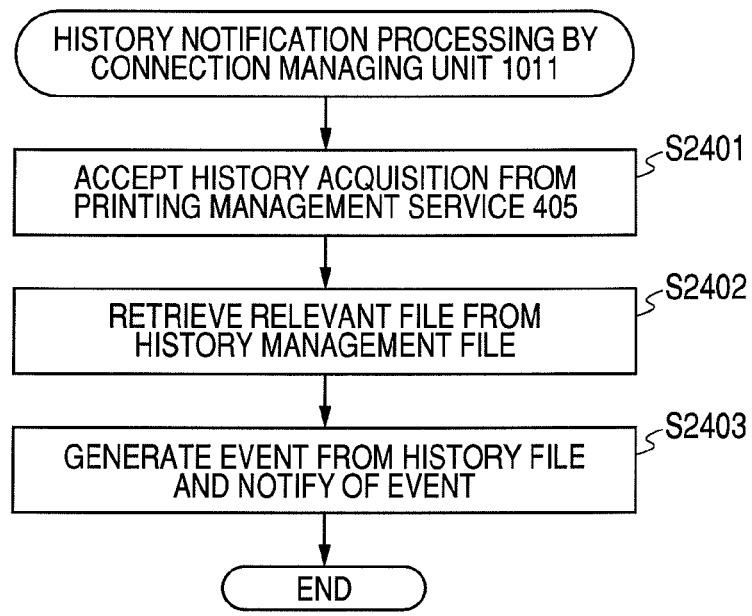
FIG. 24 is a flowchart illustrating history-acquisition processing by the device scheduler 103.

FIG. 24 is the processing flow when the device scheduler 103 is asked by the printing-management service 405 for history acquisition.

First, the device scheduler 103 is asked by the printing-management service for the history acquisition at S2401. The asking for the history acquisition corresponds to the processing at S2003 in FIG. 20. The received history-acquisition request includes a unique ID. At S2402, a history file matching the unique ID is retrieved from the history-management file with reference to the schedule list in FIG. 12. Then, at S2403, a job-completed event is generated using the history file found by the retrieval and notified to the printing-management service. The history file includes at least a printing processing result of an uncompleted printing job (printing completed or printing uncompleted) at monitoring interruption.

The above respective flowcharts are executed so that a load on the printing-management server 101 can be significantly reduced. A single server can monitor a large number of devices and track populating and completion of large quantity of printing jobs. As a result, the cost for the printing-management server 101 can be significantly reduced.

For example, to obtain effects similar to the above embodiment, in the case that printing jobs populated to devices arranged on remote places are managed in a centralized way, a method of further arranging an integrated server can be applied. The server arranges print servers on the places and manages the print servers in an integrated way. In this configuration, a load on the integrated server can be reduced. However, the installment cost and management cost of the print servers arranged on the places is high. Further, if a trouble occurs in any of the print servers, it is difficult for the integrated server to find and manage the trouble. Furthermore, other processing is needed to compile job information generated by the print servers on a plurality of places. Still further, if a device is changed, troublesome tasks is needed to keep consistency among information of the print servers and the integrated server. According to this embodiment, for example, the printing jobs populated to the devices arranged on the remote places are managed in the centralized way as described in the above, the cost of a print server to monitor the states of the printing jobs can be reduced.

Detailed Description of Transferring Connection and Monitoring Connection

Figure 28:
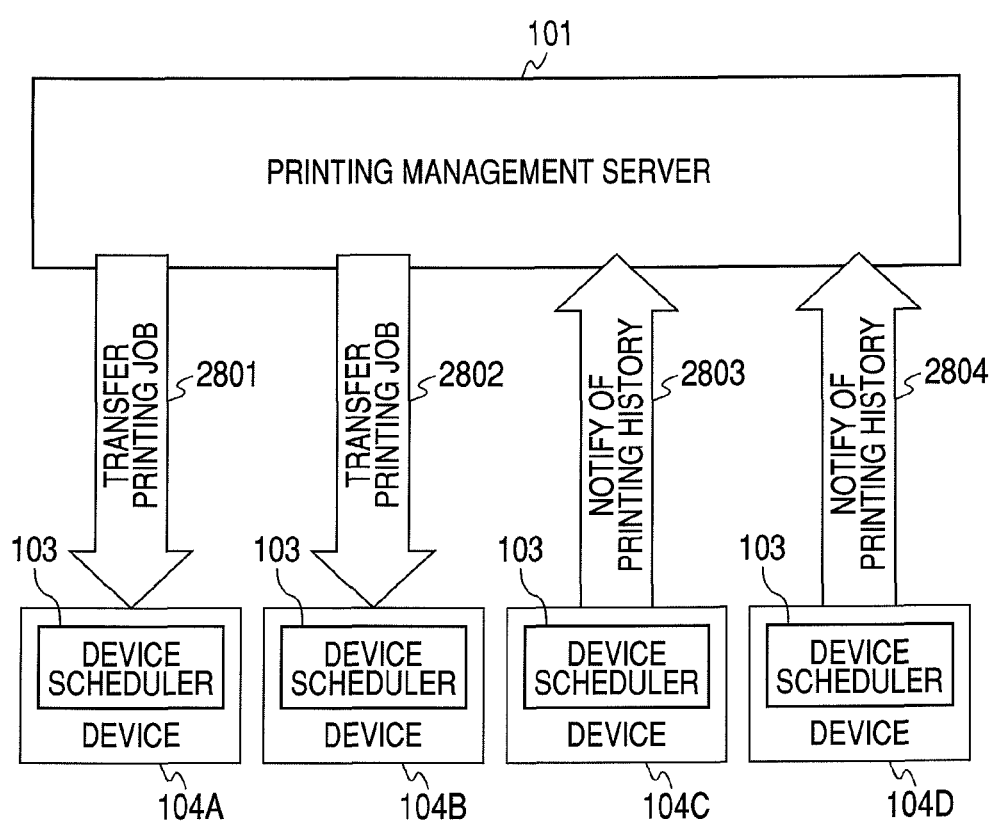
FIG. 28 is a schematic depiction of features of the printing system according to the embodiment.
Figure 29:
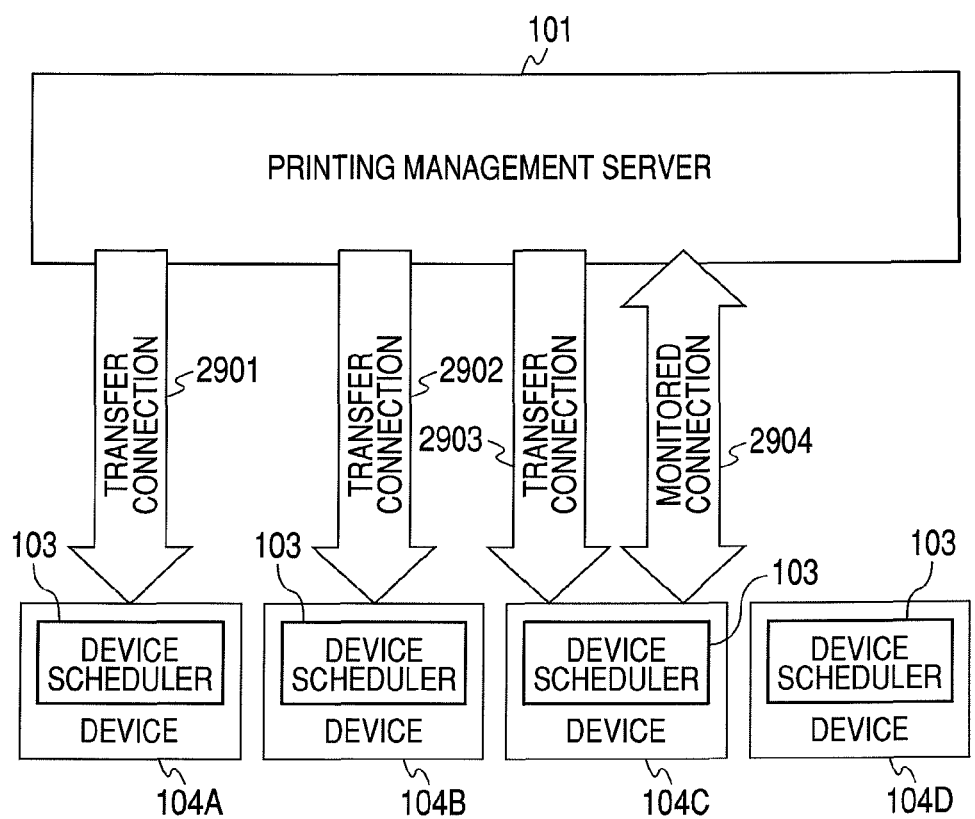
FIG. 29 is a schematic depiction of features of the printing system according to the embodiment.

FIGS. 28 and 29 are schematic depictions of dualistic management of the transferring connection and monitoring connection being a feature of the printing system according to the present invention.

In FIG. 28, the transfer unit 432 transfers a printing job to the devices 104A and 104B, while the devices 104C and 104D notifies the respective device-managing units 421 of printing histories (2803 and 2804).

The transferring connection (2801 and 2802) for a printing job and the monitoring connection (2803 and 2804) for the device state are separately managed, i.e., managed in a dualistic way as described in the above, so that printing processing and printing-management processing can be performed in parallel.

In this embodiment, the number of monitoring connections and the number of transferring connections can be set. FIG. 29 illustrates the case that the maximum limit number of connections is four (2901, 2902, 2903 and 2904), for example. The example shows the status that the devices 104A and 104B are transfer-connected and the device 104C is transfer-connected and monitoring-connected and the status that the number of transferring connections is three and the number of monitoring connections is one. If the monitoring connection and the transferring connection are managed in a centralized way, the both numbers equal to each other; for example, the number of transferring connections is two and the number of monitoring connections is two. The present invention implements the separate management of the transferring connection and the monitoring connection. Accordingly, processing to improve transfer efficiency within the number of connections of four, that is, the status can be realized that the transferring connections are many more than the monitoring connections. The status is realized by separately managing, i.e. managing in a dualistic way, the number of monitoring connections and the number of transferring connections within the limit of the maximum number of connections. A value being set as the number of monitoring connections is used to determine at S1603 in FIG. 16 whether or not the number of monitoring connections reaches the maximum number. A value being set as the number of transferring connections is used to determine at S2211 in FIG. 22 whether or not the transferring connection is possible.

Second Embodiment

The maximum number of transferring connections, the maximum number of monitoring connections and the maximum number of connections are decided according to specific numbers being previously set by a user arbitrarily via a setting screen. The maximum number of connections, the maximum number of transferring connections and the maximum number of monitoring connections are changed into set values depending on a printing system environment, so that, setting can be done depending on a system policy to give weight to the monitoring or give weight to the transfer, for example.

Other Embodiments

The present invention can be applied to a system including a plurality of machine (for example, host computer, interface machine, reader, printer or the like) or applied to an apparatus including a single machine (for example, copier, facsimile apparatus or the like). The object of the present invention can be accomplished by supplying a recording medium for recording a program code to implement the functions of the embodiment described before to the system or apparatus and causing a computer in the system or apparatus to read out and execute the program code stored in the storage medium. In this case, the program code itself read out from the storage medium implements the functions of the embodiment described before. The program code itself and the storage medium for storing the program code are components of the present invention.

In the present invention, the operating system (OS) running on the computer based on directions in the program code performs part or all of actual processing so that the processing realizes the functions of the embodiment described before. Also in the present invention, the program code read out from the storage medium can be written in a memory provided in a function expansion card inserted to the computer or a function expansion unit connected to the computer. In that case, the CPU provided in the function expansion card or the function expansion unit based on directions in the written program code performs part or all of the actual processing so that the processing realizes the functions of the embodiment described before.

According to a further embodiment of the invention there is provided an information processing apparatus that can communicate with a plurality of printing devices, comprising: a first registering unit configured to sequentially register the printing devices which are output targets of printing jobs and from which state information is acquired in a monitoring queue in a first registration order; a second registering unit configured to sequentially register the printing devices which are the output targets of the printing jobs in a transferring queue in a second registration order; a state monitoring unit configured to connect the printing devices according to the first registration order and acquire the state information from the printing devices; and a transfer control unit configured to transfer the printing jobs according to the second registration order, wherein the state monitoring unit sequentially switches connections to the printing devices according to the first registration order and acquires the state information from the printing devices even if the transfer control unit has not completed the transfer of the printing jobs.

According to a further embodiment of the present invention there is provided a job processing method for an information processing apparatus that can communicate with a plurality of printing devices, comprising: sequentially registering the printing devices which are output targets of printing jobs and from which state information is acquired in a monitoring queue in a first registration order; sequentially registering the printing devices which are the output targets of the printing jobs in a transferring queue in a second registration order; connecting the printing devices according to the first registration order and acquiring the state information from the printing devices; and transferring the printing jobs according to the second registration order, wherein the connecting and acquiring step comprises sequentially switching connections to the printing devices according to the first registration order and acquiring the state information from the printing devices even if the transferring step has not completed the transfer of the printing jobs.

The exemplary embodiments of the present invention have been described in the above. However, it is apparent that the present invention is not limited to the embodiments but can include various variations or applications within the scope of the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-346199, filed Dec. 22, 2006, which is hereby incorporated by reference in its entirety.

What is claimed is:

1. An information-processing apparatus configured to communicate with a plurality of printing devices, comprising:
   a first registering unit configured to sequentially register the plurality of printing devices which are output targets of printing jobs and from which state information is to be acquired in a monitoring queue in a first registration order;
   a second registering unit configured to sequentially register the plurality of printing devices which are the output targets of the printing jobs in a transferring queue in a second registration order;
   a state-monitoring unit configured to connect the plurality of printing devices according to the first registration order and a first maximum number of connections by the state-monitoring unit and acquire the state information from the plurality of printing devices; and
   a transfer-control unit configured to connect the plurality of printing devices according to the second registration order and a second maximum number of connections by the transfer-control unit and transfer the printing jobs to the plurality of connected printing devices,
   wherein, when a predetermined condition on the connection by the state-monitoring unit is satisfied, the state-monitoring unit disconnects one of the plurality of printing devices, connects another printing apparatus according to the monitoring queue, and the first registering unit again registers the disconnected printing device in the monitoring queue, while the transfer-control unit continues to transfer the printing jobs to the plurality of printing devices.

2. The apparatus according to claim 1, wherein the first maximum number is less than the second maximum number.

3. The apparatus according to claim 1, further comprising a connection-number-setting unit configured to set the first maximum number and the second maximum number.

4. The apparatus according to claim 1, wherein when the state-monitoring unit acquires the state information indicating that the print job transfer to the one printing device is completed, the first registering unit does not again register the printing device.

5. A job-processing method for an information-processing apparatus that can communicate with a plurality of printing devices, comprising:
   sequentially registering the plurality of printing devices which are output targets of printing jobs and from which state information is to be acquired in a monitoring queue in a first registration order;
   sequentially registering the plurality of printing devices which are the output targets of the printing jobs in a transferring queue in a second registration order;
   connecting the plurality of printing devices according to the first registration order and a maximum number of connections and acquiring the state information from the plurality of printing devices; and
   connecting the plurality of printing devices according to the second registration order and a second maximum number of connections and transferring the printing jobs to the plurality of connected printing devices,
   wherein, when a predetermined condition on the connection is satisfied, disconnecting one of the plurality of printing devices, connecting another printing apparatus according to the monitoring queue, and again registering the disconnected printing device in the monitoring queue, while the transfer-control unit continues to transfer the printing jobs to the plurality of printing devices.

6. The method according to claim 5, wherein the first maximum number of connections in the connecting and acquiring step is less than the second maximum number of connections in the transferring step.

7. The method according to claim 5, further comprising setting the first maximum number and the second maximum number.

8. The method according to claim 5, wherein when the state information is acquired indicating that the print job transfer to the one printing device is completed, the printing device is not again registered.

9. A non-transitory computer-readable storage medium storing a program for causing an information-processing apparatus to execute a job-processing method for an information-processing apparatus that can communicate with a plurality of printing devices, the method comprising:
   sequentially registering the plurality of printing devices which are output targets of printing jobs and from which state information is to be acquired in a monitoring queue in a first registration order;
   sequentially registering the plurality of printing devices which are the output targets of the printing jobs in a transferring queue in a second registration order;
   connecting the plurality of printing devices according to the first registration order and a maximum number of connections and acquiring the state information from the plurality of printing devices; and
   connecting the plurality of printing devices according to the second registration order and a second maximum number of connections and transferring the printing jobs to the plurality of connected printing devices,
   wherein, when a predetermined condition on the connection is satisfied, disconnecting one of the plurality of printing devices, connecting another printing apparatus according to the monitoring queue, and again registering the disconnected printing device in the monitoring queue, while the transfer-control unit continues to transfer the printing jobs to the plurality of printing devices.

10. An information-processing apparatus configured to communicate with a plurality of printing devices, comprising:

a first registering means for sequentially registering the plurality of printing devices which are output targets of printing jobs and from which state information is to be acquired in a monitoring queue in a first registration order;

a second registering means for sequentially registering the plurality of printing devices which are the output targets of the printing jobs in a transferring queue in a second registration order;

a state-monitoring means for connecting the plurality of printing devices according to the first registration order and a first maximum number of connections by the state-monitoring unit and acquire the state information from the plurality of printing devices; and a transfer-control means for connecting the plurality of printing devices according to the second registration order and a second maximum number of connections by the transfer-control unit and transfer the printing jobs to the plurality of connected printing devices, wherein, when a predetermined condition on the connection by the state-monitoring means is satisfied, the state-monitoring means disconnects one of the plurality of printing devices, connects another printing apparatus according to the monitoring queue, and the first registering means again registers the disconnected printing device in the monitoring queue, while the transfer-control unit continues to transfer the printing jobs to the plurality of printing devices.

* * * * *